(12) United States Patent
Zhang

(10) Patent No.: US 12,361,055 B2
(45) Date of Patent: Jul. 15, 2025

(54) PICTURE SEARCH METHOD AND DEVICE

(71) Applicant: Huawei Technologies Co., Ltd., Shenzhen (CN)

(72) Inventor: Xin Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 502 days.

(21) Appl. No.: 17/704,853

(22) Filed: Mar. 25, 2022

(65) Prior Publication Data

US 2022/0215050 A1 Jul. 7, 2022

Related U.S. Application Data

(63) Continuation of application No. PCT/CN2020/113095, filed on Sep. 2, 2020.

(30) Foreign Application Priority Data

Sep. 26, 2019 (CN) .......................... 201910917611.5

(51) Int. Cl.
*G06F 16/58* (2019.01)
*G06F 16/532* (2019.01)
*G06F 16/54* (2019.01)
*G06F 16/55* (2019.01)

(52) U.S. Cl.
CPC ........ *G06F 16/5866* (2019.01); *G06F 16/532* (2019.01); *G06F 16/54* (2019.01); *G06F 16/55* (2019.01)

(58) Field of Classification Search
CPC .... G06F 16/5866; G06F 16/532; G06F 16/54; G06F 16/55; H04M 1/72403
See application file for complete search history.

(56) References Cited

U.S. PATENT DOCUMENTS

| 7,716,157 | B1 | 5/2010 | Bourdev et al. |
| 2003/0128389 | A1 | 7/2003 | Matraszek et al. |
| 2006/0056737 | A1 | 3/2006 | Ohtsuka et al. |
| 2012/0002878 | A1 | 1/2012 | Kuriyama |
| 2014/0237395 | A1* | 8/2014 | Ogilvie ................. G06F 40/106 715/760 |

(Continued)

FOREIGN PATENT DOCUMENTS

| CN | 104050285 A | 9/2014 |
| CN | 104063465 A | 9/2014 |

(Continued)

*Primary Examiner* — Akwasi M Sarpong
*Assistant Examiner* — Michael L Burleson
(74) *Attorney, Agent, or Firm* — Conley Rose, P.C.

(57) ABSTRACT

A picture search method includes that an electronic device displays a search interface of a gallery, where the search interface includes a search input box, and the gallery includes a first picture and a second picture. The first picture includes an image of a first person. When the first picture is captured, an age of the first person is a first age. The second picture includes an image of a second person. When the second picture is captured, an age of the second person is the first age. In response to a first search keyword received from a user in the search input box, the first picture and the second picture that match the first search keyword are obtained from the gallery and are displayed, where the first search keyword includes the first age.

20 Claims, 46 Drawing Sheets

(56) References Cited

U.S. PATENT DOCUMENTS

| | | | | |
|---|---|---|---|---|
| 2016/0125476 A1* | 5/2016 | Stewart | ............ | G06Q 30/0276 |
| | | | | 705/14.72 |
| 2021/0209700 A1* | 7/2021 | Lubash | ................ | H04L 67/14 |
| 2022/0215050 A1 | 7/2022 | Zhang | | |

FOREIGN PATENT DOCUMENTS

| | | | |
|---|---|---|---|
| CN | 105138681 | A | 12/2015 |
| CN | 105488111 | A | 4/2016 |
| CN | 106919604 | A | 7/2017 |
| CN | 107832420 | A | 3/2018 |
| CN | 107908770 | A | 4/2018 |
| CN | 110851637 | A | 2/2020 |
| JP | 2006079461 | A | 3/2006 |

* cited by examiner

CONT. FROM FIG. 6A

PICTURE SEARCH METHOD AND DEVICE

CROSS-REFERENCE TO RELATED APPLICATIONS

This is a continuation of International Patent Application No. PCT/CN2020/113095 filed on Sep. 2, 2020, which claims priority to Chinese Patent Application No. 201910917611.5 filed on Sep. 26, 2019. The disclosures of the aforementioned applications are hereby incorporated by reference in their entireties.

TECHNICAL FIELD

Embodiments of this application relate to the field of terminal technologies, and in particular, to a picture search method and a device.

BACKGROUND

With popularization of smart terminals, users habitually use terminals (for example, a mobile phone) to take pictures, to record moments of their lives. To facilitate the user to manage and view the pictures on the terminal, a picture management function and a picture search function are configured in a "Photo" application or another similar application on the terminal. For example, the "Photo" application on the terminal may classify pictures on the terminal based on information such as photographing times and photographing locations of the pictures to generate albums. The user can search for information such as a time and a location to view a related picture.

SUMMARY

This application provides a picture search method and a device to increase dimensions of picture search, so that a user can view a picture of an age by using a simple operation.

To achieve the foregoing objective, this application uses the following technical solutions.

According to a first aspect, this application provides a picture search method. The picture search method is used to search for a picture stored in an electronic device. Further, the electronic device displays a search interface of an application, the search interface includes a search input box, the application is used to manage a gallery of the electronic device, and the gallery includes a first picture and a second picture. The first picture includes an image of a first person. When the first picture is taken, an age of the first person is a first age. The second picture includes an image of a second person. When the second picture is taken, an age of the second person is the first age. The electronic device obtains, from the gallery in response to a first search keyword that includes the first age and that is entered by a user in the search input box, the first picture and the second picture that match the first search keyword, and displays the first picture and the second picture.

The age of the person in the first picture is the first age and the age of the person in the second picture is also the first age. Therefore, after the user enters the first age, the electronic device can obtain, from the gallery, the first picture and the second picture that are related to the first age, and display the first picture and the second picture. In the solution provided in this application, the user can view the picture of the first age by using a simple operation. Therefore, better experience is provided for the user.

With reference to the first aspect, in a possible design manner, the search interface further includes one or more age options. Correspondingly, that "the electronic device obtains, from the gallery in response to a first search keyword entered by a user in the search input box, the first picture and the second picture that match the first search keyword" in the method includes that the electronic device obtains, from the gallery in response to a selection operation of the user on a first age option, the first picture and the second picture that match the first age. Information about the first age option is the first age, and the first age option is one of the one or more age options.

The user may directly enter the first search keyword in the search input box, or may input the first search keyword by tapping the age option.

With reference to the first aspect, in another possible design manner, the picture search method provided in this application further includes that the electronic device obtains, from the gallery in response to a second search keyword entered by the user in the search input box, the first picture matching the second search keyword, where the second search keyword includes the first age and a name of the first person.

The electronic device may further search for a picture by using an age and a name of a person as dimensions.

With reference to the first aspect, in another possible design manner, the picture search method provided in this application further includes that the electronic device obtains, from the gallery in response to a third search keyword entered by the user in the search input box, the second picture matching the third search keyword, where the third search keyword includes the first age, a name of the second person, and a first location, and a photographing location of the second picture is the first location.

The electronic device may further search for a picture by using an age, a name of a person, and a photographing location as dimensions.

With reference to the first aspect, in another possible design manner, in a scenario in which a search keyword entered by the user is the first search keyword, the electronic device further stores a first mapping relationship, where the first mapping relationship includes a correspondence between the first age and the first picture and a correspondence between the first age and the second picture. Correspondingly, that "the electronic device obtains, from the gallery, the first picture and the second picture that match the first search keyword" in the method includes that the electronic device obtains, from the gallery based on the first mapping relationship, the first picture and the second picture that match the first age.

With reference to the first aspect, in another possible design manner, in a scenario in which a search keyword entered by the user is the first search keyword, the electronic device further stores a second mapping relationship, where the second mapping relationship includes a correspondence between the first age, the name of the first person, and the first picture. Correspondingly, the "obtaining, from the gallery in response to a second search keyword entered by the user in the search input box, the first picture matching the second search keyword" in the method includes that the electronic device obtains, from the gallery based on the second mapping relationship, the first picture matching the first age and the name of the first person.

With reference to the first aspect, in another possible design manner, in a scenario in which a search keyword entered by the user is the first search keyword, the electronic device further stores a third mapping relationship, where the third mapping relationship includes a correspondence between the first age, the name of the second person, the first location, and the second picture. Correspondingly, the "obtaining, from the gallery in response to a third search keyword entered by the user in the search input box, the second picture matching the third search keyword" in the method includes that the electronic device obtains, from the gallery based on the third mapping relationship, the second picture matching the first age, the name of the second person, and the first location.

According to a second aspect, this application provides an electronic device. The electronic device includes a display, a memory, and one or more processors. The display and the memory are coupled to the processor. The memory is configured to store computer program code. The computer program code includes computer instructions. When the processor executes the computer instructions, the electronic device performs the picture search method according to any one of the first aspect or the possible design manners of the first aspect.

According to a third aspect, this application provides a chip system, where the chip system is used in an electronic device including a touchscreen, the chip system includes one or more interface circuits and one or more processors, the interface circuit and the processor are interconnected through a line, the interface circuit is configured to receive a signal from a memory of the electronic device, and send the signal to the processor, where the signal includes computer instructions stored in the memory, and when the processor executes the computer instructions, the electronic device performs the picture search method according to any one of the first aspect and possible design manners of the first aspect.

According to a fourth aspect, this application provides a computer storage medium, where the computer storage medium includes computer instructions, and when the computer instructions are run on an electronic device, the electronic device is enabled to perform the picture search method according to any one of the first aspect and possible design manners of the first aspect.

According to a fifth aspect, this application provides a computer program product. When the computer program product runs on a computer, the computer is enabled to perform the picture search method according to any one of the first aspect and the possible design manners of the first aspect.

It may be understood that for beneficial effects that can be achieved by the electronic device provided in the second aspect, the chip system in the third aspect, the computer storage medium in the fourth aspect, and the computer program product in the fifth aspect, refer to the beneficial effects in any one of the first aspect and possible design manners of the first aspect. Details are not described herein again.

DESCRIPTION OF EMBODIMENTS

Figure 1:
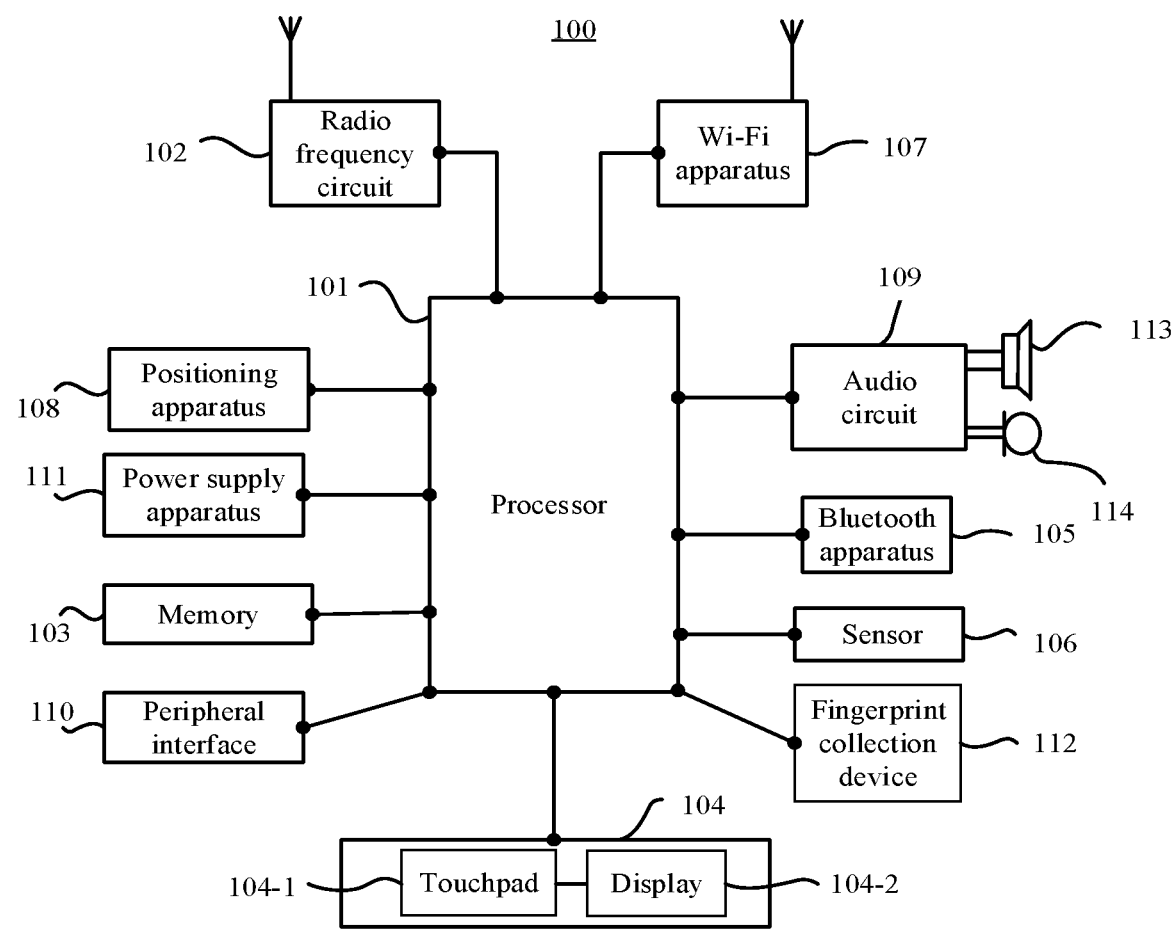
FIG. 1 is a schematic diagram of a hardware structure of a mobile phone according to an embodiment of this application.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

Embodiments of this application provide a picture search method and a device, which may be used in a process in which a user searches a gallery for a picture, and further, may be used in the process in which the user searches the gallery for the picture that includes a person and in which an age of the person is a first age.

In the embodiments of this application, the gallery includes a plurality of pictures. The plurality of pictures may include a photo photographed by a device, a picture downloaded by the device from a server, a picture transmitted (for example, transmitted through BLUETOOTH) by another device to the device, a picture transmitted by a social application (for example, WECHAT or QQ) to the device, a picture obtained by screenshot, and the like. The pictures in the gallery may be grouped based on different dimensions (for example, a photographing time, a portrait, a photographing location, an age, and a picture source) or dimension combinations. Each group of pictures form an album or a video. In the embodiments of this application, "grouping pictures based on portraits" means that the pictures are grouped based on specific persons, and each picture group obtained after grouping corresponds to one person. For example, the pictures after grouping include a picture group of a user A and a picture group of a user B. In the embodiments of this application, an age is used to represent an age of a person in a picture including the person.

In the embodiments of this application, the device may identify pictures including persons in the gallery, and divide the pictures including the persons into a plurality of picture groups based on ages. Different picture groups correspond to different ages. For example, photos including persons are divided into a picture group of one year old, a picture group of two years old, and a picture group of three years old. In other words, in the embodiments of this application, the device may classify the pictures in the gallery based on the dimension of age. After receiving, from the user, an operation of searching for a picture of the first age, the device obtains, from the gallery, the picture matching the first age, and displays the obtained picture. In this way, the user can view a picture of a specific age, diversity of picture search is improved, and user experience is further improved.

Certainly, the device may alternatively classify the pictures in the gallery based on ages and another dimension. For example, the device classifies the pictures in the gallery based on two dimensions: ages and portraits, or classifies the pictures in the gallery based on two dimensions: ages and photographing locations (or photographing locations), or classifies the pictures in the gallery based on three dimensions: ages, portraits, and photographing locations. An example in which the device classifies the pictures including persons (or pictures) in the gallery based on two dimensions: ages and portraits is mainly used for description.

In the embodiments of this application, the device may be a terminal device such as a mobile phone (for example, a mobile phone 100 shown in FIG. 1), a tablet computer, a personal computer (PC), a personal digital assistant (PDA), a netbook, or a wearable electronic device.

For example, the device may be configured to manage a picture stored in the device, perform the picture search method provided in the embodiments of this application, obtain the picture of the first age in response to a search operation of the user, and display the picture of the first age. Alternatively, a client used to manage a picture may be installed in the device (for example, "Baby Album" or "GOOGLE Album"). After logging in to a picture management account, the client may manage a picture stored on a cloud server. In addition, the client may further be used to perform the picture search method provided in the embodiments of this application, obtain the picture of the first age in response to a search operation of the user, and display the picture of the first age.

The client used to manage a picture may be an embedded application (that is, a system application on the device) installed in the device or a downloadable application. The embedded application is an application provided as a part of the device (for example, a mobile phone). The downloadable application is an application that can provide an Internet Protocol (IP) Multimedia Subsystem (IMS) connection of the downloadable application. The downloadable application may be an application pre-installed on a device or a third-party application that is downloaded by a user and installed on a device.

For example, the client used to manage a picture may be "Photo", "Album", or "Gallery", and the method may be applied to a process in which a user searches for a picture in "Photo", "Album", or "Gallery". The application may be "Baby album". The method may be applied to a process in which a user searches for a picture in "Baby album". Certainly, the client used to manage a picture in this application may alternatively be in another form. Details are not described herein.

In the embodiments of this application, the device may alternatively be a cloud server configured to store and manage a picture. The cloud server may receive a picture uploaded by a terminal, then perform the picture search method provided in the embodiments of this application, obtain the picture of the first age in response to a search operation of the user, and display the picture of the first age. A specific form of the device is not particularly limited in the embodiments of this application.

For example, the device is the mobile phone 100 shown in FIG. 1. The mobile phone 100 may further include components such as a processor 101, a radio frequency (RF) circuit 102, a memory 103, a touchscreen 104, a BLUETOOTH apparatus 105, one or more sensors 106, a WI-FI FI apparatus 107, a positioning apparatus 108, an audio circuit 109, a peripheral interface 110, and a power supply apparatus 111. These components may communicate with each other through one or more communications buses or signal lines (not shown in FIG. 1). A person skilled in the art may understand that a hardware structure shown in FIG. 1 does not constitute a limitation on the mobile phone, and the mobile phone 100 may include more or fewer components than those shown in the figure, or some components may be combined, or some components may be split, or there may be a different component arrangement.

The following describes in detail the components of the mobile phone 100 with reference to FIG. 1.

The processor 101 is a control center of the mobile phone 100. The processor 101 is connected to all components of the mobile phone 100 through various interfaces and lines, and performs various functions of the mobile phone 100 and data processing by running or executing an application stored in the memory 103 and invoking data stored in the memory 103. In some embodiments, the processor 101 may include one or more processing units. In some embodiments of this application, the processor 101 may further include a fingerprint verification chip configured to configured to perform verification on a collected fingerprint.

The radio frequency circuit 102 may be configured to receive and send a radio signal in an information receiving/sending process or a call process. Particularly, after receiving downlink data from a base station, the radio frequency circuit 102 may send the downlink data to the processor 101 for processing, and send related uplink data to the base station. The radio frequency circuit usually includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communication standard or protocol, including but not limited to a global system for mobile communications, a general packet radio service, code division multiple access, wideband code division multiple access, long term evolution, an e-mail, a short message service, and the like.

The memory 103 is configured to store the application and the data. The processor 101 performs the various functions of the mobile phone 100 and the data processing by running the application and the data that are stored in the memory 103. The memory 103 mainly includes a program storage area and a data storage area. The program storage area may store an operating system, and an application required by at least one function (for example, a sound play function and an image display function). The data storage area may store data (for example, audio data and a phonebook) created based on usage of the mobile phone 100. In addition, the memory 103 may include a high-speed random-access memory (RAM), and may further include a non-volatile memory, such as a magnetic disk storage device, a flash memory, or another volatile solid-state storage device. The memory 103 may store various operating systems such as an iOS® operating system and an Android® operating system. The memory 103 may be independent, and is connected to the processor 101 through the communications bus, or the memory 103 may be integrated into the processor 101.

The touchscreen 104 may further include a touchpad 104-1 and a display 104-2.

The touchpad 104-1 may collect a touch event (for example, an operation performed by a user on the touchpad 104-1 or near the touchpad 104-1 by using any appropriate object such as a finger or a stylus) performed by the user of the mobile phone 100 on or near the touchpad 104-1, and send collected touch information to another component (for example, the processor 101). The touch event performed by the user near the touchpad 104-1 may be referred to as a floating touch. The floating touch may indicate that the user does not need to directly touch the touchpad to select, move, or drag an object (for example, an icon), and the user only needs to be near a device to perform a desired function. In addition, the touchpad 104-1 may be implemented in a plurality of types such as a resistive type, a capacitive type, an infrared type, and a surface acoustic wave type.

The display 104-2 may be configured to display information entered by the user, information provided for the user, and various menus of the mobile phone 100. The display 104-2 may be configured in a form of a liquid crystal display, an organic light-emitting diode, or the like. The touchpad 104-1 may cover the display 104-2. After detecting a touch event on or near the touchpad 104-1, the touchpad 104-1 transfers the touch event to the processor 101 to determine a type of the touch event. Then, the processor 101 may provide a corresponding visual output on the display 104-2 based on the type of the touch event. Although in FIG. 1, the touchpad 104-1 and the display 104-2 are used as two independent components to implement input and output functions of the mobile phone 100, in some embodiments, the touchpad 104-1 and the display 104-2 may be integrated to implement the input and output functions of the mobile phone 100. It may be understood that the touchscreen 104 is formed by stacking a plurality of layers of materials. In the embodiments of this application, only the touchpad (layer) and the display (layer) are displayed, and another layer is not described in the embodiments of this application. In addition, the touchpad 104-1 may be disposed on a front side of the mobile phone 100 in a full panel form. The display 104-2 may also be disposed on the front side of the mobile phone 100 in a full panel form. In this way, a bezel-less structure can be implemented on the front side of the mobile phone.

In addition, the mobile phone 100 may further have a fingerprint recognition function. For example, a fingerprint collection device 112 may be disposed on the back of the mobile phone 100 (for example, below a rear-facing camera), or a fingerprint collection device 112 may be disposed on the front of the mobile phone 100 (for example, below the touchscreen 104). For another example, a fingerprint collection device 112 may be disposed on the touchscreen 104 to implement the fingerprint recognition function. In other words, the fingerprint collection device 112 may be integrated into the touchscreen 104 to implement the fingerprint recognition function of the mobile phone 100. In this case, the fingerprint collection device 112 is disposed on the touchscreen 104, and may be a part of the touchscreen 104, or may be disposed on the touchscreen 104 in another manner. A main component of the fingerprint collection device 112 in the embodiments of this application is a fingerprint sensor. The fingerprint sensor may use any type of sensing technology, including but not limited to an optical sensing technology, a capacitive sensing technology, a piezoelectric sensing technology, an ultrasonic sensing technology, and the like.

The mobile phone 100 may further include the BLUETOOTH apparatus 105 configured to configured to implement data exchange between the mobile phone 100 and another short-distance device (for example, a mobile phone or a smartwatch). In the embodiments of this application, the BLUETOOTH apparatus may be an integrated circuit, a BLUETOOTH chip, or the like.

The mobile phone 100 may further include at least one type of sensor 106, such as a light sensor, a motion sensor, or another sensor. Further, the light sensor may include an ambient light sensor and a proximity sensor. The ambient light sensor may adjust luminance of the display of the touchscreen 104 based on intensity of ambient light. The proximity sensor may power off the display when the mobile phone 100 moves to an ear. As a motion sensor, an accelerometer sensor may detect for a value of an acceleration in various directions (there are usually three axes), may detect for a value and a direction of gravity when the mobile phone is still, and may be applied to an application (for example, landscape/portrait mode switching, a related game, or magnetometer posture calibration) for recognizing a posture of the mobile phone, a function (for example, a pedometer or a keystroke) related to vibration recognition, and the like. For another sensor that may be further configured on the mobile phone 100, for example, a gyroscope, a barometer, a hygrometer, a thermometer, or an infrared sensor, details are not described herein.

The WI-FI apparatus 107 is configured to provide, for the mobile phone 100, network access that complies with a WI-FI-related standard protocol. The mobile phone 100 may access a WI-FI access point through the WI-FI apparatus 107, to help the user receive and send an email, browse a web page, access streaming media, and the like. The WI-FI apparatus 107 provides wireless broadband Internet access for the user. In some other embodiments, the WI-FI apparatus 107 may alternatively be used as a WI-FI wireless access point, and may provide WI-FI network access for another device.

The positioning apparatus 108 is configured to provide a geographical location for the mobile phone 100. It can be understood that the positioning apparatus 108 may be further a receiver of a positioning system such as a Global Positioning System (GPS), a BEIDOU navigation satellite system, or a Russian Global Navigation Satellite System (GLONASS). After receiving the geographical location sent by the positioning system, the positioning apparatus 108 sends the information to the processor 101 for processing, or sends the information to the memory 103 for storage. In some other embodiments, the positioning apparatus 108 may further be a receiver of an assisted GPS (AGPS). The AGPS system serves as an assisted server to assist the positioning apparatus 108 in completing ranging and positioning services. In this case, the assisted positioning server communicates, by using a wireless communications network, with the positioning apparatus 108 (a receiver of the GPS) of the device such as the mobile phone 100 and provides positioning assistance. In some other embodiments, the positioning apparatus 108 may alternatively be a positioning technology based on a WI-FI access point. Because each WI-FI access point has a globally unique media access control (MAC) address, if WI-FI is enabled, the device may scan and collect broadcast signals near the WI-FI access point. Therefore, the MAC address broadcast by the WI-FI access point may be obtained. The device sends, to a location server through the wireless communications network, data (for example, the MAC address) that can be used to mark the WI-FI access point. The location server finds a geographical location of each WI-FI access point, and bases on strength of the WI-FI broadcast signal to calculate a geographical location of the device and send the geographical location to the positioning apparatus 108 of the device.

The audio circuit 109, a speaker 113, and a microphone 114 may provide an audio interface between the user and the mobile phone 100. The audio circuit 109 may convert received audio data into an electrical signal and then transmit the electrical signal to the speaker 113, and the speaker 113 converts the electrical signal into a sound signal for output. In addition, the microphone 114 converts a collected sound signal into an electrical signal. The audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identification module card). For example, the mobile phone 100 is connected to the mouse by using a Universal Serial Bus (USB) interface, and the mobile phone 100 is connected, by using a metal contact on a card slot of the subscriber identification module (SIM) card, to the SIM card provided by a telecommunications operator. The peripheral interface 110 may be configured to couple the external input/output peripheral device to the processor 101 and the memory 103.

In the embodiments of this application, the mobile phone 100 may communicate with another device in a device group through the peripheral interface 110. For example, the mobile phone 100 may receive, through the peripheral interface 110, display data sent by another device, and display the display data, and the like. This is not limited in the embodiments of this application.

The mobile phone 100 may further include the power supply apparatus 111 (for example, a battery and a power management chip) that supplies power to the components. The battery may be logically connected to the processor 101 through the power management chip, to implement functions such as charging management, discharging management, and power consumption management by using the power supply apparatus 111.

Optionally, the mobile phone 100 may further include a camera. The camera may be a front-facing camera or a rear-facing camera. This is not limited in this embodiment of this application.

Figure 2:
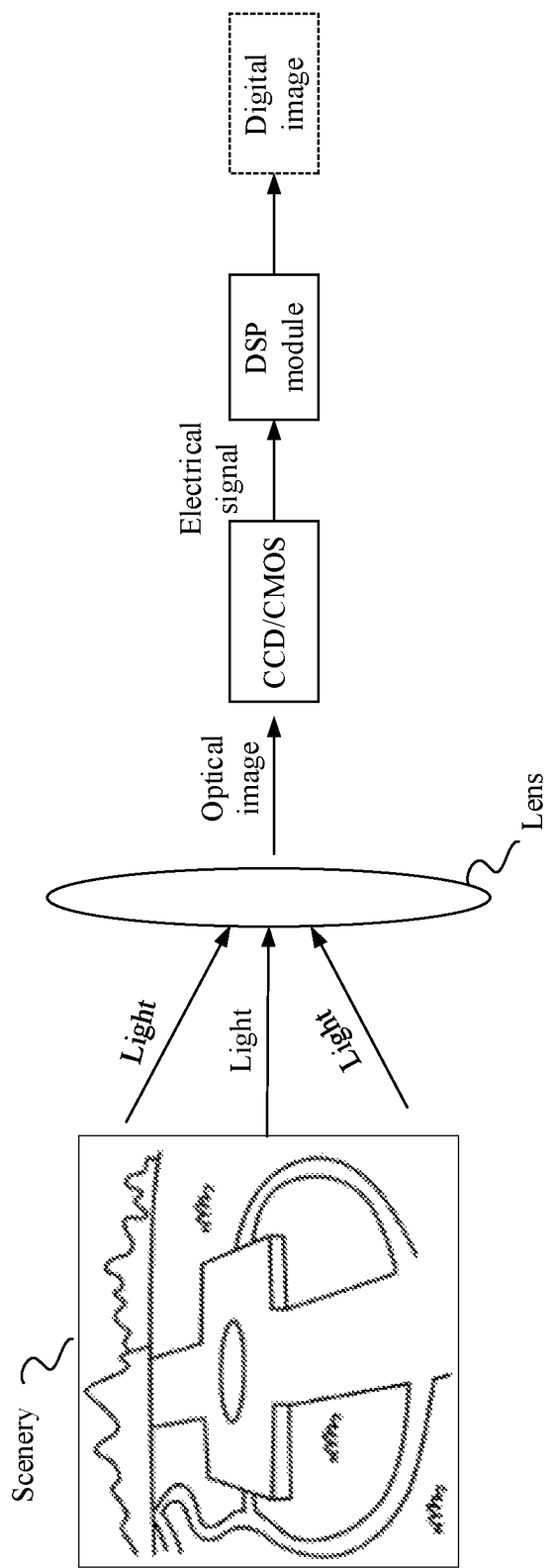
FIG. 2 is a schematic diagram of a photographing principle of a camera according to an embodiment of this application.

Further, as shown in FIG. 2, the camera generally includes a lens and an image sensor. The image sensor may be any photosensitive device such as a charge-coupled device (CCD) or a complementary metal-oxide-semiconductor (CMOS).

In a photographing process, reflected light of a scene object passes through the lens to generate an optical image, the optical image is projected onto an image sensor, the image sensor converts a received optical signal into an electrical signal, and the camera sends the obtained electrical signal to a digital signal processing (DSP) module for digital signal processing to finally obtain a digital image. The digital image may be output on the mobile phone 100 by the display 104-2, or the digital image may be stored in the memory 103.

The DSP module may be integrated into the processor 101 in a form of a function module, or may be independently disposed in the mobile phone 100 in a form of a chip. This is not limited in the embodiments of this application.

For example, the digital image generated by the DSP module may be stored in the memory 103 in an exchangeable image file (EXIF) format.

A picture in the EXIF format may include picture information and EXIF information. The picture information includes information about each pixel in the picture, for example, a grayscale value of the pixel. The EXIF information includes attribute information of the picture, for example, a time, a location, a shutter, an aperture, white balance, sensitivity, a focal length, a brand and/or a model of a camera and/or a lens when the picture is taken.

Further, when indicating the camera 115 to capture a picture, the processor 101 uses a current system time of the mobile phone 100 as a photographing time, triggers a sensor such as the positioning apparatus 108 to obtain the EXIF information such as a current photographing location of the mobile phone 100, and stores the EXIF information and the picture information of the picture in the memory 103.

For a picture including a portrait, the processor 101 may further identify the portrait in the picture by using a neural network model or another face recognition technology, and use the recognized portrait as attribute information of the picture. In addition, for a picture including a portrait, the processor 101 may further obtain, from another application (such as a calendar application), information such as a birthday recorded by the user, further determine an age of a person in the picture with reference to a photographing time, and use the determined age as attribute information of the picture.

In this way, the processor 101 may obtain, by reading the EXIF information of the picture, the attribute information such as the portrait in the picture and an age of a person indicated by the portrait. When creating an album for the user, the processor 101 may read EXIF information of each picture in the gallery, divide pictures of a portrait and/or an age into a group, then make an album by using the pictures divided into the group, and present the album to the user.

Although not shown in FIG. 1, the mobile phone 100 may further include a flashlight, a micro projection apparatus, a near-field communication (NFC) apparatus, and the like. Details are not described herein.

The picture search method provided in this embodiment of this application may be performed by a picture search apparatus. The apparatus may be a device (for example, the mobile phone 100 shown in FIG. 1) configured to manage a picture, a central processing unit (CPU) of the device, a control module configured to search for a picture in the device, or a client configured to manage and search for a picture in the device. In the embodiments of this application, an example in which the picture search method is performed by the mobile phone 100 is used to describe the picture search method provided in this application.

Figure 3:
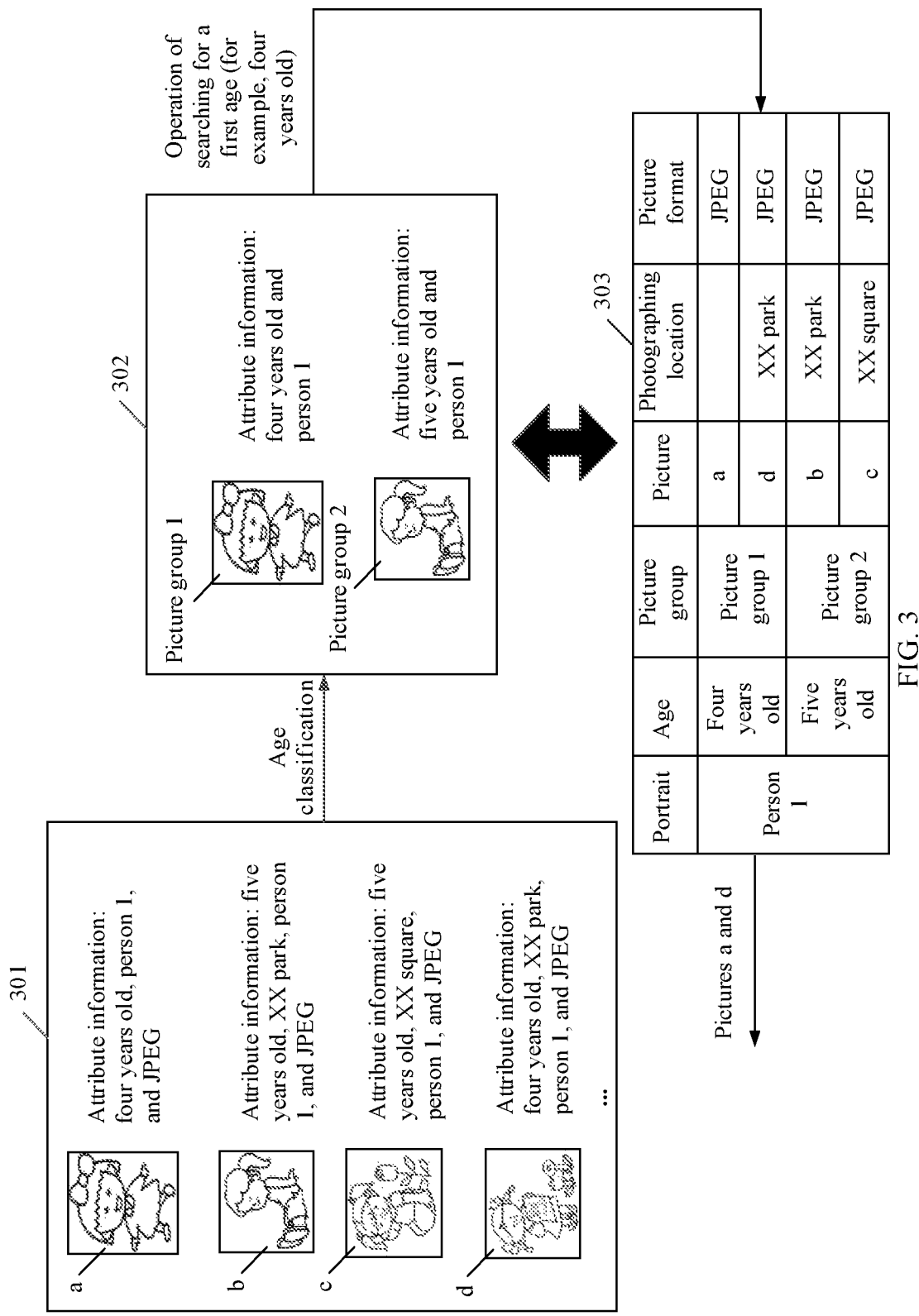
FIG. 3 is a frame diagram of a system principle of a picture search method according to an embodiment of this application.

FIG. 3 is a schematic diagram of a principle frame of a picture search method according to an embodiment of this application. A mobile phone 100 may obtain attribute information of each of a plurality of pictures (including pictures such as a picture a, a picture b, a picture c, and a picture d) shown in 301 in FIG. 3. For example, the attribute information of the picture a shown in FIG. 3 may include four years old and a person 1, the attribute information of the picture b shown in FIG. 3 may include five years old, XX park, and the person 1, the attribute information of the picture c shown in FIG. 3 may include five years old, XX square, and the person 1, and the attribute information of the picture d shown in FIG. 3 may include four years old, XX park, and the person 1.

Optionally, the attribute information of the picture further includes format information (for example, a Joint Photographic Experts Group (JPEG) format), a picture source (for example, selfie, WECHAT, and BLUETOOTH), and the like of the picture. For example, as shown in FIG. 3, the attribute information of the picture a may further include a format of the picture a: JPEG, the attribute information of the picture b may further include a format of the picture b: JPEG, the attribute information of the picture c may further include a format of the picture c: JPEG, and the attribute information of the picture d may further include a format of the picture d: JPEG.

After obtaining the attribute information of each picture, the mobile phone 100 may group the plurality of pictures based on portraits and ages to obtain at least one picture group. For example, the mobile phone 100 groups the plurality of pictures shown in 301 in FIG. 3 based on ages and portraits to obtain a picture group 1 and a picture group 2. The picture group 1 includes pictures in which the age of the person 1 is four years old, to be specific, the picture group 1 includes the picture a and the picture d. The picture group 2 includes pictures in which the age of the person 1 is five years old, to be specific, the picture group 2 includes the picture b and the picture c. Correspondingly, the mobile phone 100 generates a mapping relationship between a portrait, an age, a picture group, and a picture, and stores the mapping relationship. For the mapping relationship, refer to 303 in FIG. 3. Certainly, the mapping relationship may further include other attribute information of each picture, for example, a photographing location, and a picture format.

Subsequently, after receiving an operation, entered by the user, of searching for the first age of the person 1, the mobile phone 100 obtains and displays the picture matching the first age of the person 1. For example, as shown in FIG. 3, if a search keyword entered by the user is the person 1 and four years old, the mobile phone 100 finds, based on a mapping relationship 303, that pictures matching the person 1 and four years old are the picture a and the picture d, and the device displays the picture a and the picture d.

In actual application, due to different requirements, mapping relationships stored in the mobile phone 100 are different. For example, the mobile phone 100 may store a first mapping relationship, where the first mapping relationship includes a correspondence between an age and a picture, may store a second mapping relationship, where the second mapping relationship includes a correspondence between an age, a name of a person, and a picture, and may further store a third mapping relationship, where the third mapping relationship includes a correspondence between an age, a name of a person, a photographing location, and a picture.

The following describes the picture search method provided in the embodiments of this application with reference to the mobile phone 100 shown in FIG. 1 and the schematic diagram of the principle frame shown in FIG. 3.

The picture search method provided in the embodiments of this application includes a process in which the mobile phone 100 groups a plurality of pictures in a gallery based on two dimensions of portraits and ages to generate at least one album and a process of obtaining and displaying, in response to a search operation entered by a user, a picture matching a search keyword entered by the user.

Herein, the process in which the mobile phone 100 groups the plurality of pictures in the gallery based on the two dimensions of portraits and ages to generate the at least one album is described first.

Figure 4:
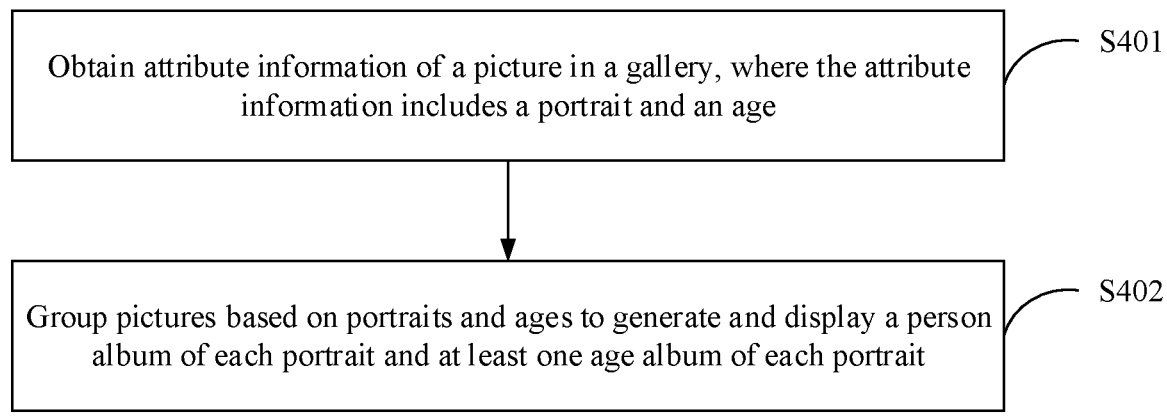
FIG. 4 is a schematic flowchart of a picture search method according to an embodiment of this application.

FIG. 4 is a schematic flowchart of a picture search method according to an embodiment of this application. As shown in FIG. 4, the picture search method provided in this embodiment of this application includes the following steps.

S401: A mobile phone 100 obtains attribute information of a picture in a gallery, where the attribute information includes a portrait and an age.

The mobile phone 100 may perform S401 and a subsequent method procedure without being perceived by a user, to generate at least one sub-album. For example, the mobile phone 100 may periodically and automatically perform S401 and the subsequent method procedure to generate the at least one sub-album, or the mobile phone 100 periodically detects a quantity of newly added pictures in the mobile phone 100, and when the quantity of newly added pictures exceeds a preset picture threshold, performs S401 and the subsequent method procedure to generate the at least one sub-album.

Certainly, the mobile phone 100 may alternatively perform S401 and the subsequent method procedure in response to an operation of the user, to generate the at least one sub-album. For example, the operation of the user may be a tap operation performed by the user on a function key or a function button that is in the mobile phone 100 and that is used to manage a picture. For example, as shown in FIG. 5B, in a "Photo" application on the mobile phone 100, a display interface 502 of a "Discovery" option includes a function button 503 used to control the mobile phone 100 to group the plurality of pictures in the gallery based on different dimensions, for example, a "Start" button 503. After receiving the tapping operation of the user on the "Start" button 503, the mobile phone 100 may perform S401 and the subsequent method procedure in response to the tapping operation of the user.

This embodiment of this application is mainly described by using an example in which the mobile phone 100 obtains a portrait and an age. Further, the mobile phone 100 in this embodiment of this application may obtain, by using any one of the following implementations, information such as a portrait and an age in a picture including the portrait:

Implementation 1: In a photographing process, the mobile phone 100 uses a label template (such as a watermark template) that has been set by the user to photograph and store a picture. The label template that has been set by the user includes an age of a person. In this way, when storing the picture, the mobile phone 100 may determine and store the attribute information of an age of a person in the picture by identifying information about the label template in the picture. Correspondingly, the mobile phone 100 obtains the attribute information of the age of the person in the picture from a memory 103.

The label template that has been set by the user may further include information such as a name (or a nickname) of a person, and a brand and a model of the mobile phone 100. In this way, when storing the picture, the mobile phone 100 may determine and store the attribute information such as a name (or a nickname) of a person in the picture, and a brand and a model of a photographing device by identifying information about the label template in the picture. Correspondingly, the mobile phone 100 obtains the name (or the nickname) of the person in the picture from the memory 103.

Generally, a name (or a nickname) of a person stored in the device uniquely corresponds to one portrait. Therefore, the name (or the nickname) of the person in this embodiment of this application is used to uniquely indicate one portrait. Further, the mobile phone 100 may further use a face recognition technology to recognize a portrait in a picture, and establish and store a mapping relationship between the portrait and a name (or a nickname). In the attribute information of the picture in this embodiment of this application, the portrait and the name may be replaced with each other.

Figure 6A:
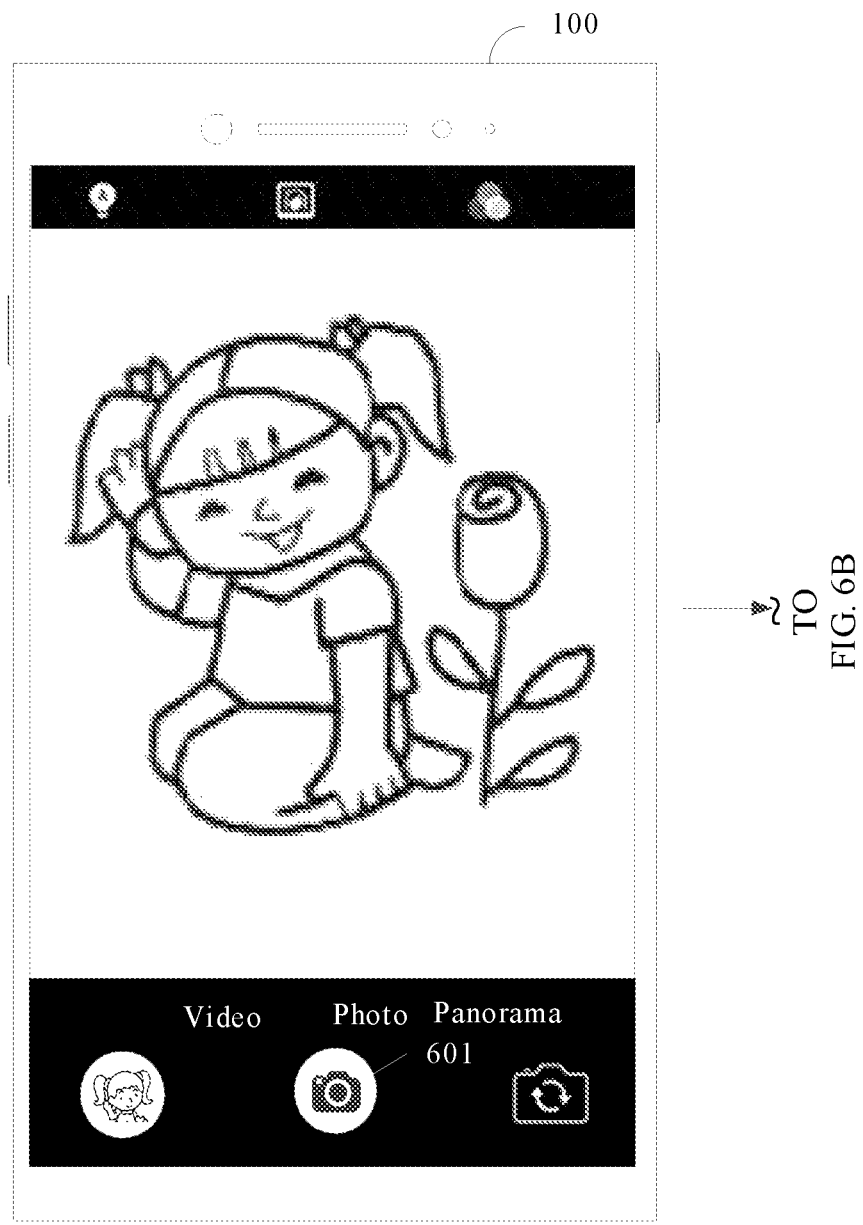
FIG. 6A and FIG. 6B are schematic diagrams of instances of display interfaces according to an embodiment of this application.
Figure 6B:
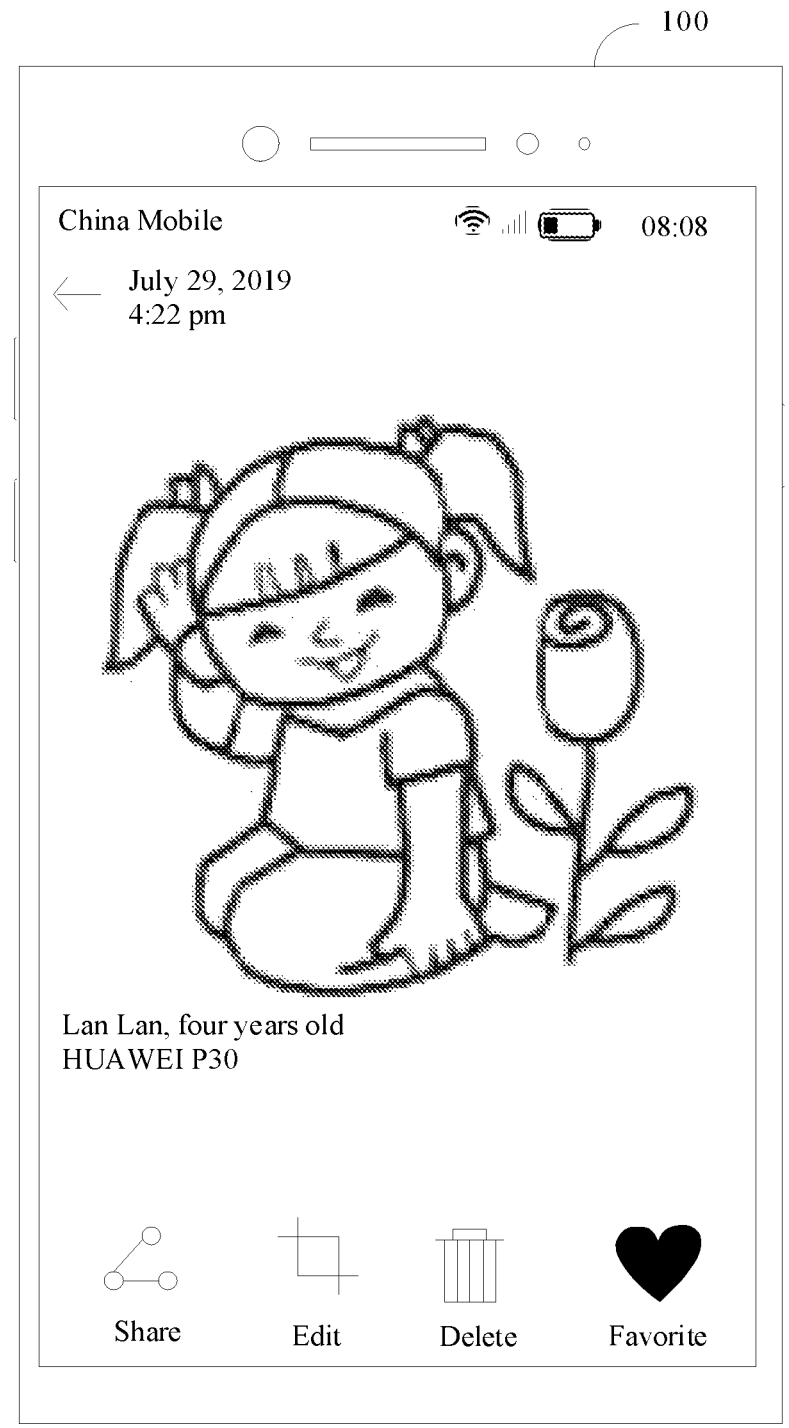

For example, the watermark template that has been set by the user includes a name "Lan Lan", an age "four years old", a brand "HUAWEI" of the mobile phone 100, and a mobile phone model "P30". After the user clicks a photographing key 601 shown in FIG. 6A, the mobile phone 100 stores a picture shown in FIG. 6B, and the picture includes label information "Lan Lan, four years old, HUAWEI P30". Subsequently, the mobile phone 100 may obtain the two pieces of attribute information of the picture, that is, the portrait and the age, from the watermark template.

If the label template that has been set by the user does not include the name (or the nickname) of the person, the mobile phone 100 may recognize the portrait in the picture by using a face recognition technology and store the portrait. In addition, the mobile phone 100 further establishes and stores a mapping relationship between a portrait and a name.

Implementation 2: After a picture is captured, the mobile phone 100 prompts the user whether to add a label. If a label needs to be added, the user enters the label. After receiving the label information entered by the user, the mobile phone 100 adds the label to the captured picture, and stores the picture with the label. The label information includes the age of the person. In this way, when storing the picture, the mobile phone 100 may determine and store the attribute information of an age of a person in the picture by identifying the label in the picture. Correspondingly, the mobile phone 100 obtains the attribute information of the age of the person in the picture from the memory 103.

The label information may further include information such as a name (or a nickname) of a person. In this way, when storing the picture, the mobile phone 100 may determine and store a name (or a nickname) of a person in the picture by identifying the label in the picture. Correspondingly, the mobile phone 100 obtains the name (or the nickname) of the person in the picture from the memory 103.

Figure 7A:
FIG. 7A, FIG. 7B, FIG. 7C, and FIG. 7D are schematic diagrams of instances of display interfaces according to an embodiment of this application.
Figure 7B:
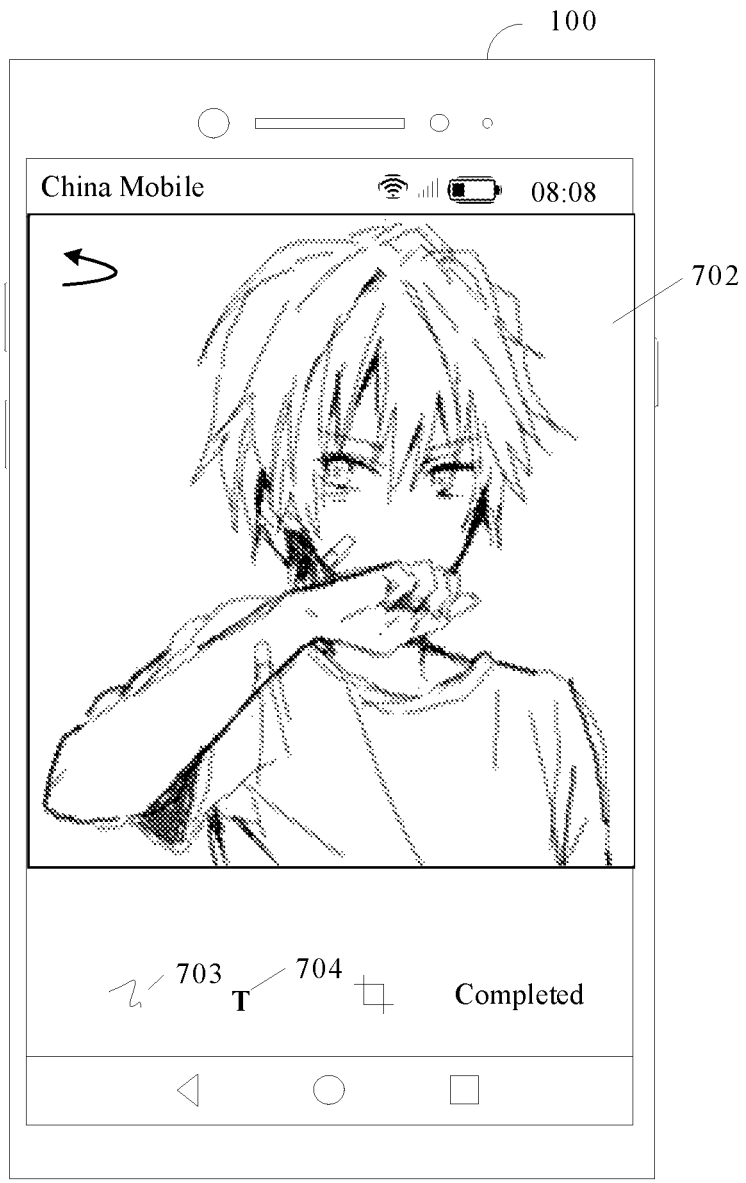
Figure 7C:
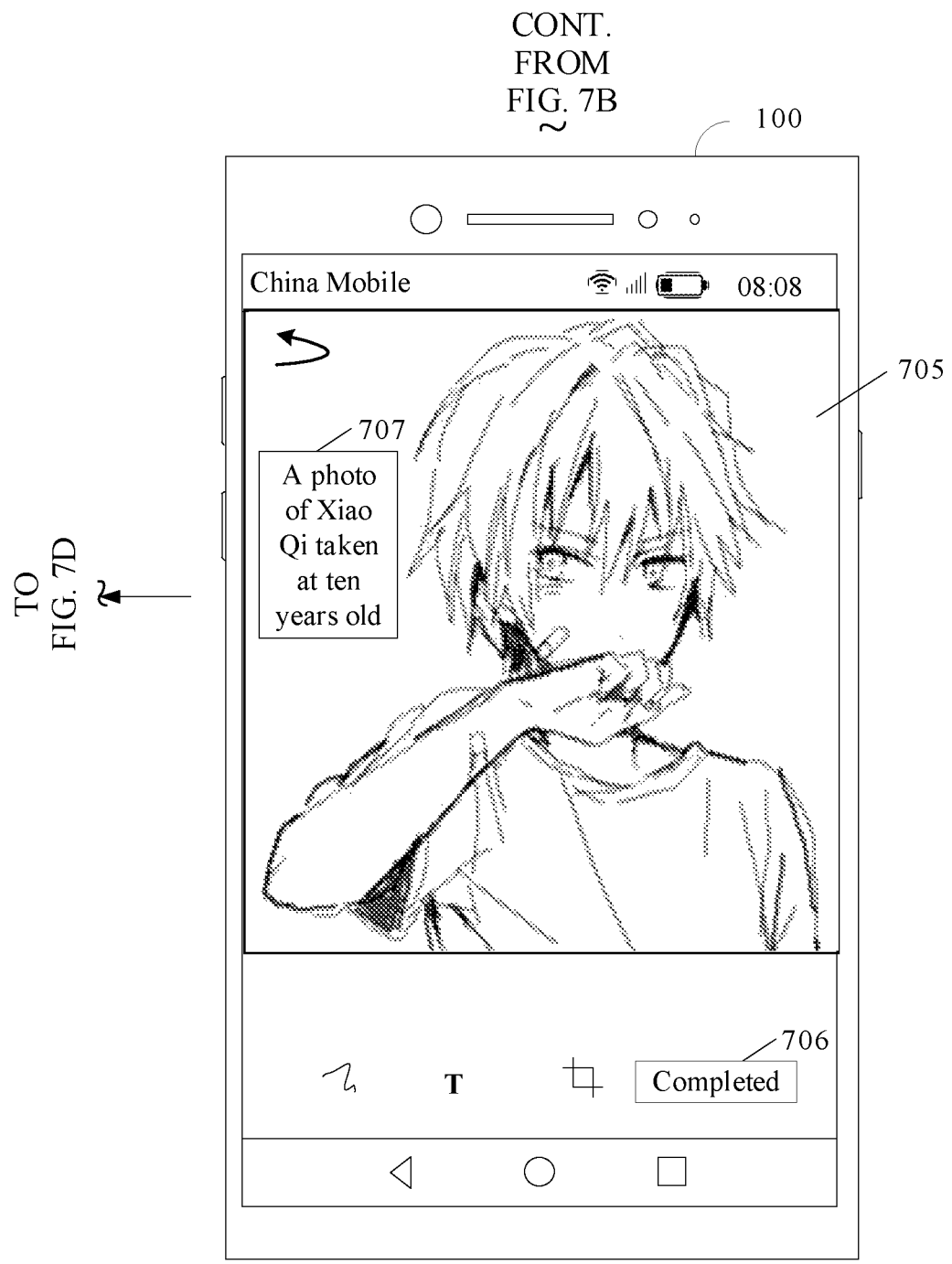
Figure 7D:
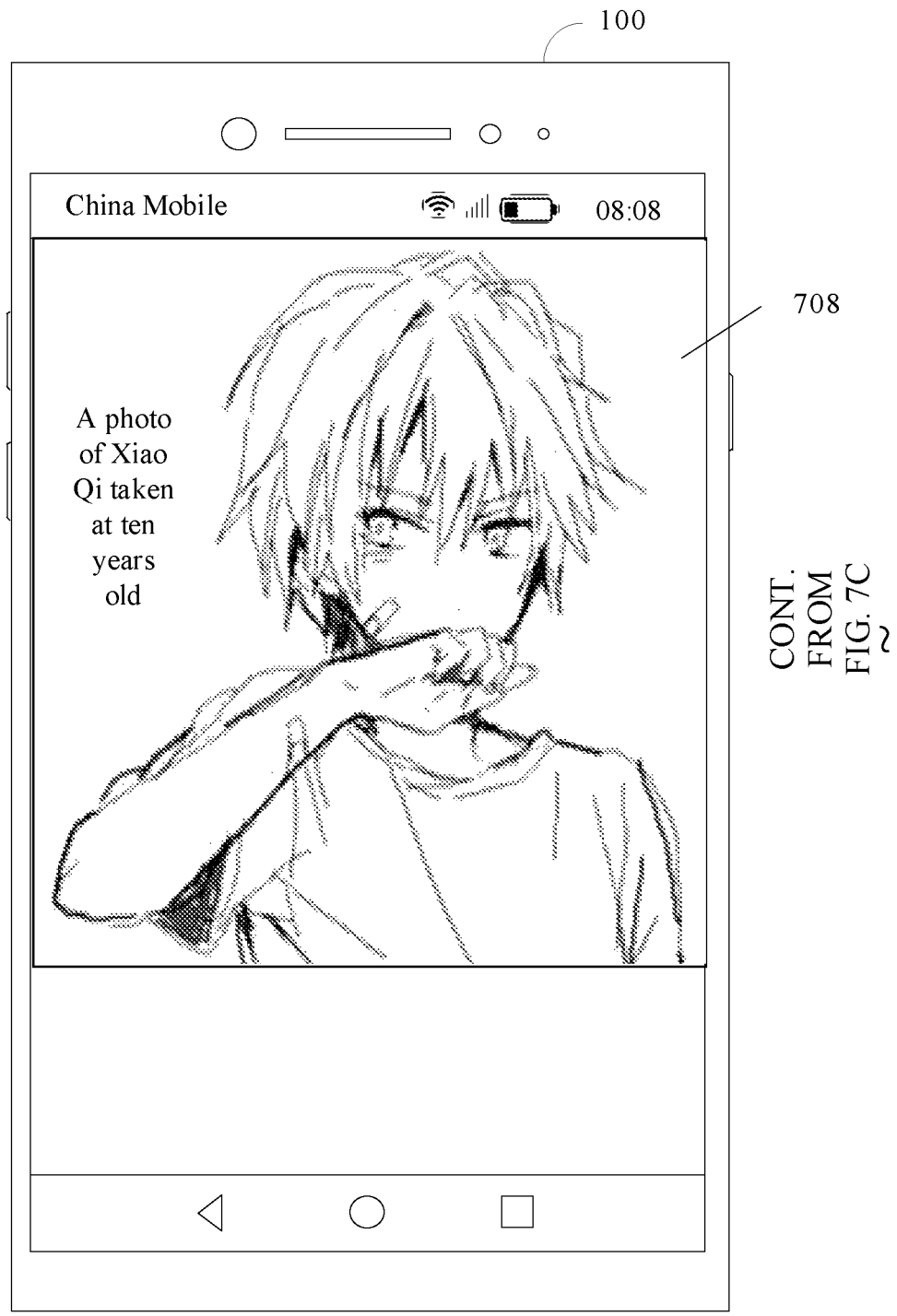

For example, after the user taps a photographing key 701 shown in FIG. 7A, the mobile phone 100 displays an interface 702 shown in FIG. 7B. The interface 702 includes a picture captured by the mobile phone 100, a control 703 for manually entering label information, and a control 704 for entering label information by using a keyboard. After the user taps the control 704 shown in FIG. 7B, the mobile phone 100 displays an interface 705 shown in FIG. 7C, where the interface 705 includes a label information input box 707. The user may enter label information "a photo of Xiao Qi taken at 10 years old" in the input box 707, and taps a "Complete" button 706 in the interface 705. In response to the tap operation performed by the user on the "Complete" button 706, the mobile phone 100 displays an interface 708 shown in FIG. 7D. The picture with the label information "a photo of Xiao Qi taken at 10 years old" is displayed in the interface 708. Correspondingly, the mobile phone 100 stores the picture displayed in the interface 708, and stores the label information "a photo of Xiao Qi taken at 10 years old" in the picture. In this way, the mobile phone 100 may directly obtain the two pieces of attribute information of the picture, that is, the portrait and the age, from the memory.

After the user taps the control 703 shown in FIG. 7B, a step performed by the mobile phone 100 is similar to the foregoing step. Details are not described herein again.

Implementation 3 After capturing a picture, the mobile phone 100 stores the picture. Subsequently, the user adds note information including an age to the picture. Correspondingly, the mobile phone 100 further stores the note information of the picture. In this way, the mobile phone 100 obtains information such as an age in the picture from the memory 103.

The note information may further include information such as a name (or a nickname) of a person. In this way, the mobile phone 100 may further store the name (or the nickname) of the person in the picture. Correspondingly, the mobile phone 100 obtains the name (or the nickname) of the person in the picture from the memory 103.

Figure 8A:
FIG. 8A, FIG. 8B, and FIG. 8C are schematic diagrams of instances of display interfaces according to an embodiment of this application.
Figure 8B:
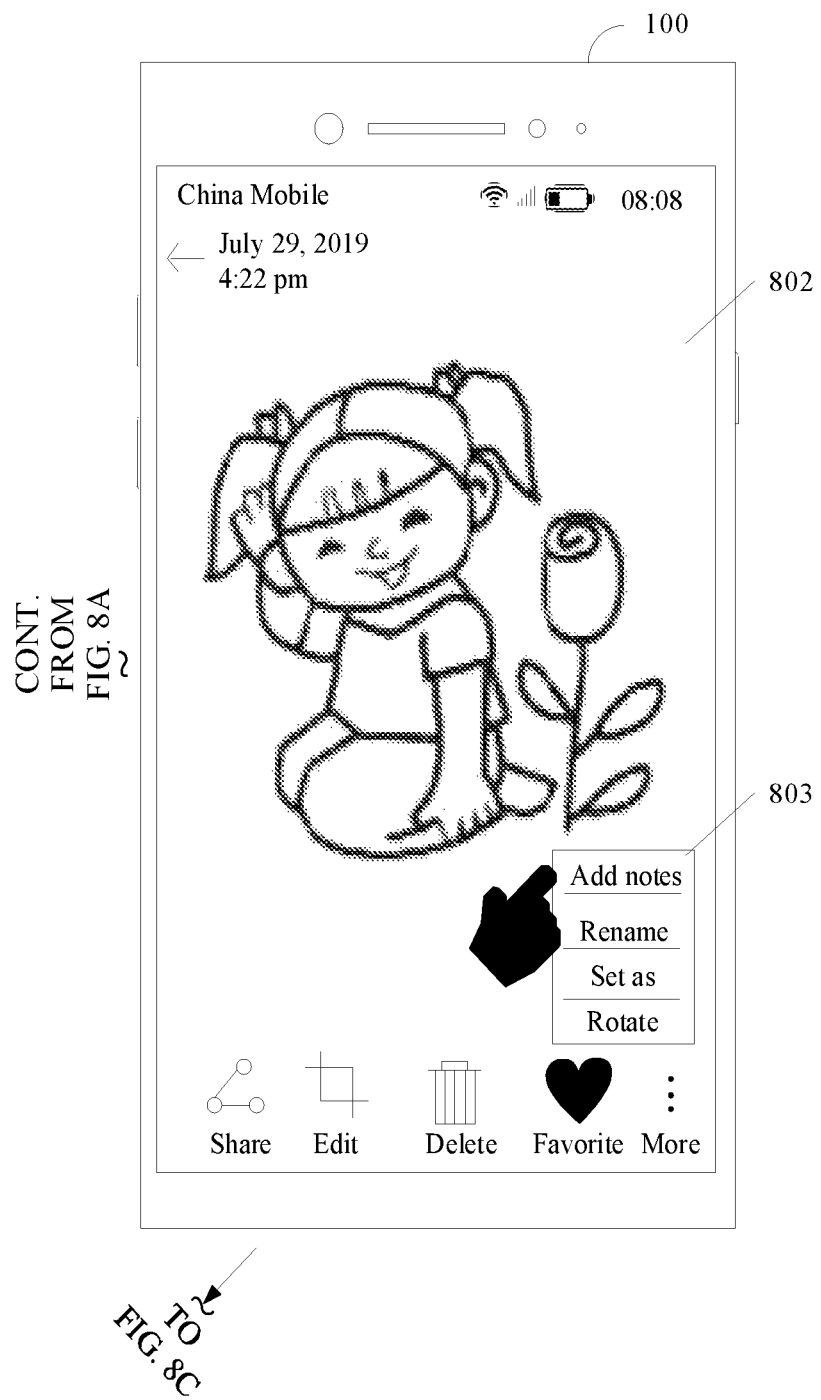
Figure 8C:
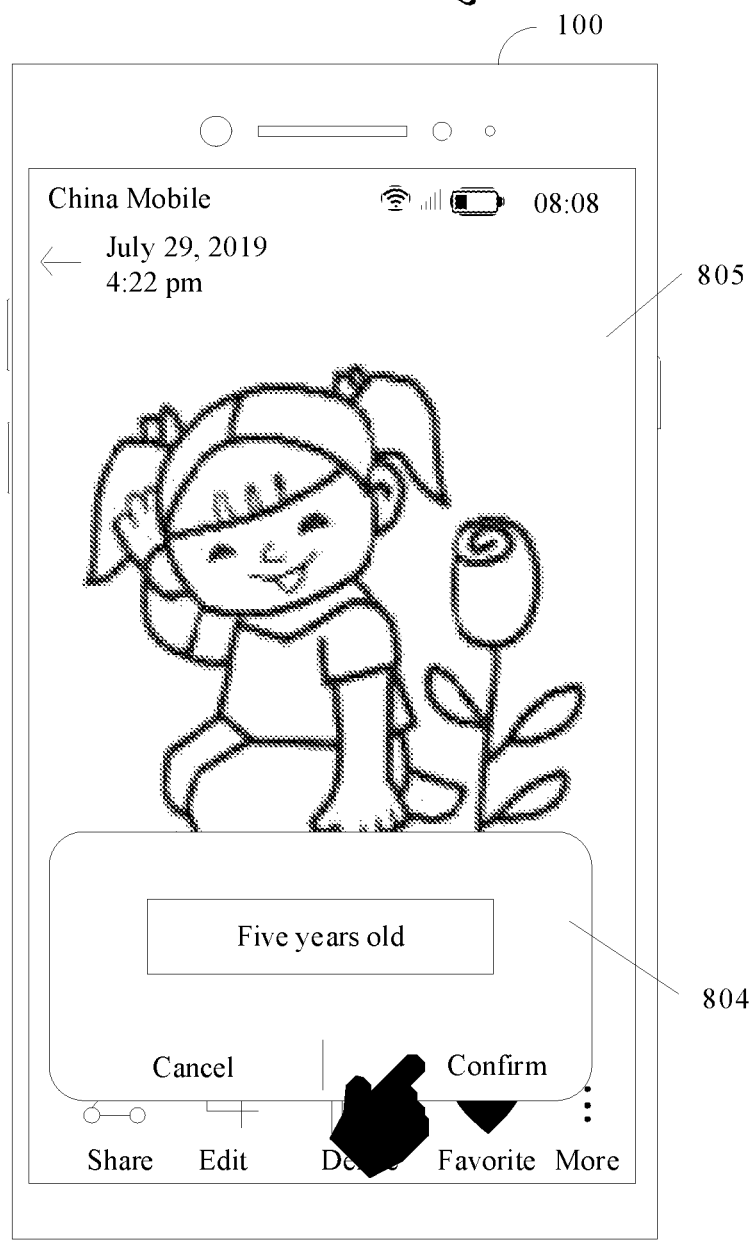

For example, after the user taps a control 801 shown in FIG. 8A, the mobile phone 100 displays an interface 802 shown in FIG. 8B. The interface 802 includes controls for managing pictures, such as adding notes 803, renaming, setting as, and rotating. After the user taps the adding notes 803 shown in FIG. 8B, the mobile phone 100 displays an interface 805 shown in FIG. 8C, where the interface 805 includes a pop-up box 804. The user may enter note information "five years old" in an input box of the pop-up box 804, and taps a "Confirm" button in the pop-up box 804. In response to the tap operation performed by the user on the "Confirm" button, the mobile phone 100 stores the note information "five years old" in the picture shown in FIG. 8A. In this way, the mobile phone 100 may directly obtain the attribute information of the picture, that is, the age, from the memory.

Certainly, the note information may further include information such as a name or a nickname.

Optionally, the note information added by the user is not displayed in the picture.

Implementation 4 The mobile phone 100 obtains a date of birth of a person, subsequently, identifies, by using a face recognition technology, pictures including a same portrait, calculates an age of the person in each picture based on a photographing time of each picture and the obtained date of birth, and stores the two pieces of attribute information, that is, the portrait and the age, in each picture. Then, the mobile phone 100 obtains the portrait and the age in the picture from the memory 103.

Figure 9A:
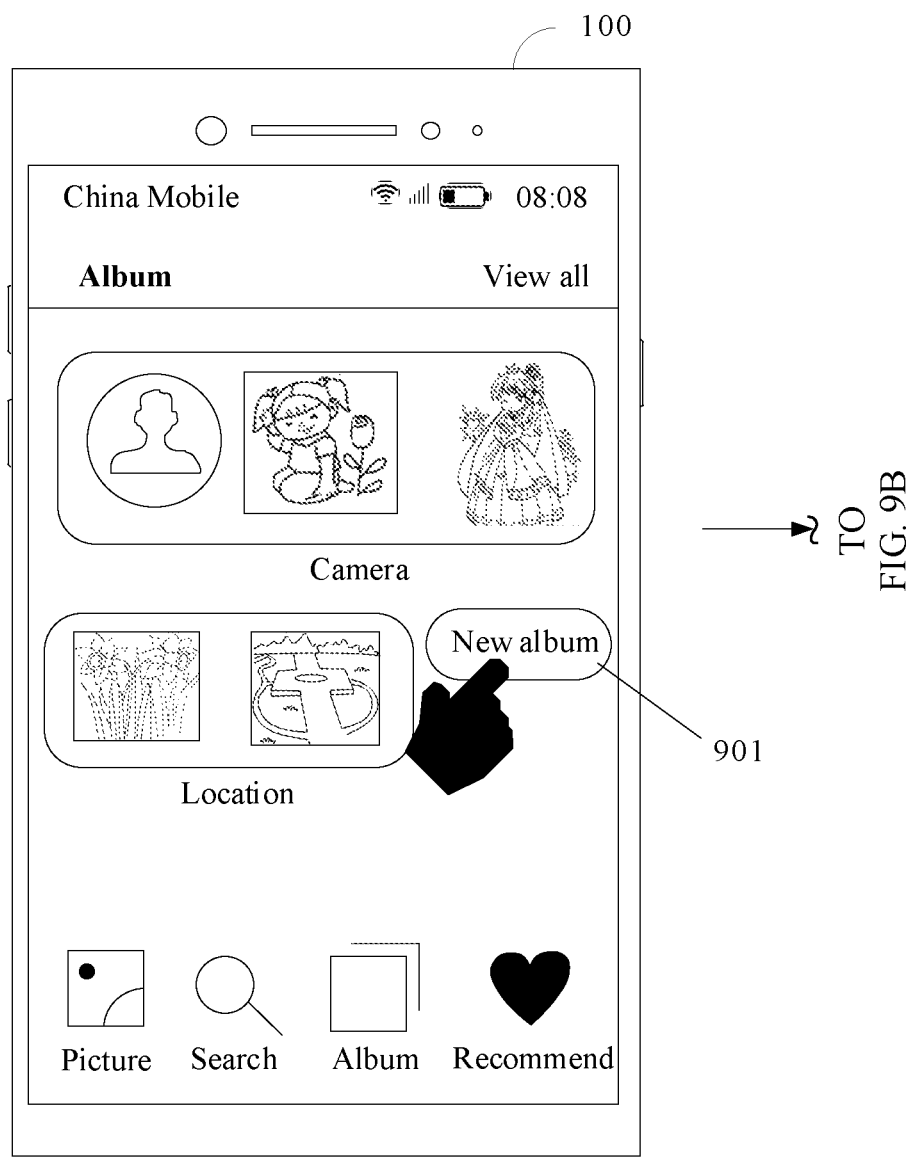
FIG. 9A, FIG. 9B, FIG. 9C, and FIG. 9D are schematic diagrams of instances of display interfaces according to an embodiment of this application.
Figure 9B:
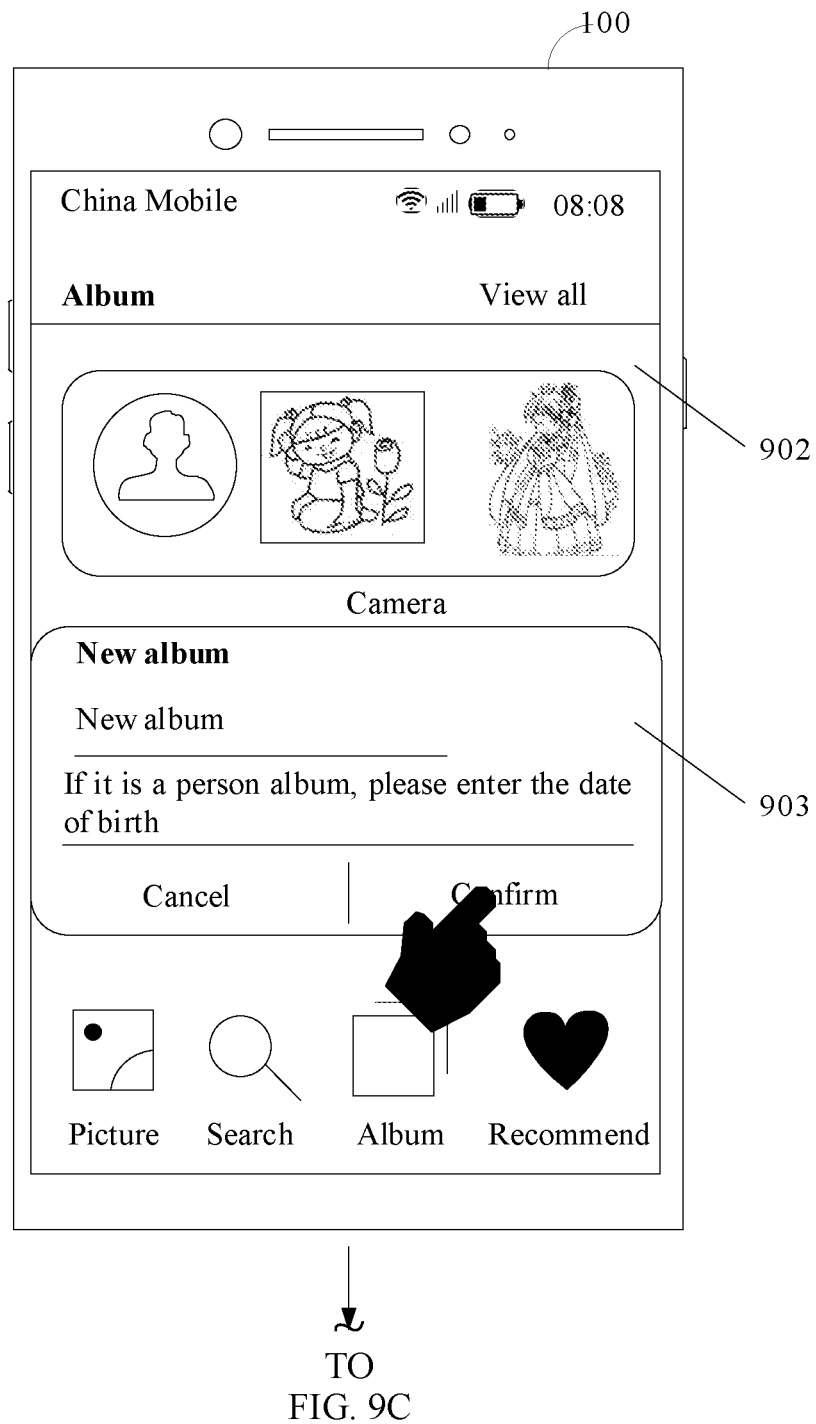
Figure 9C:
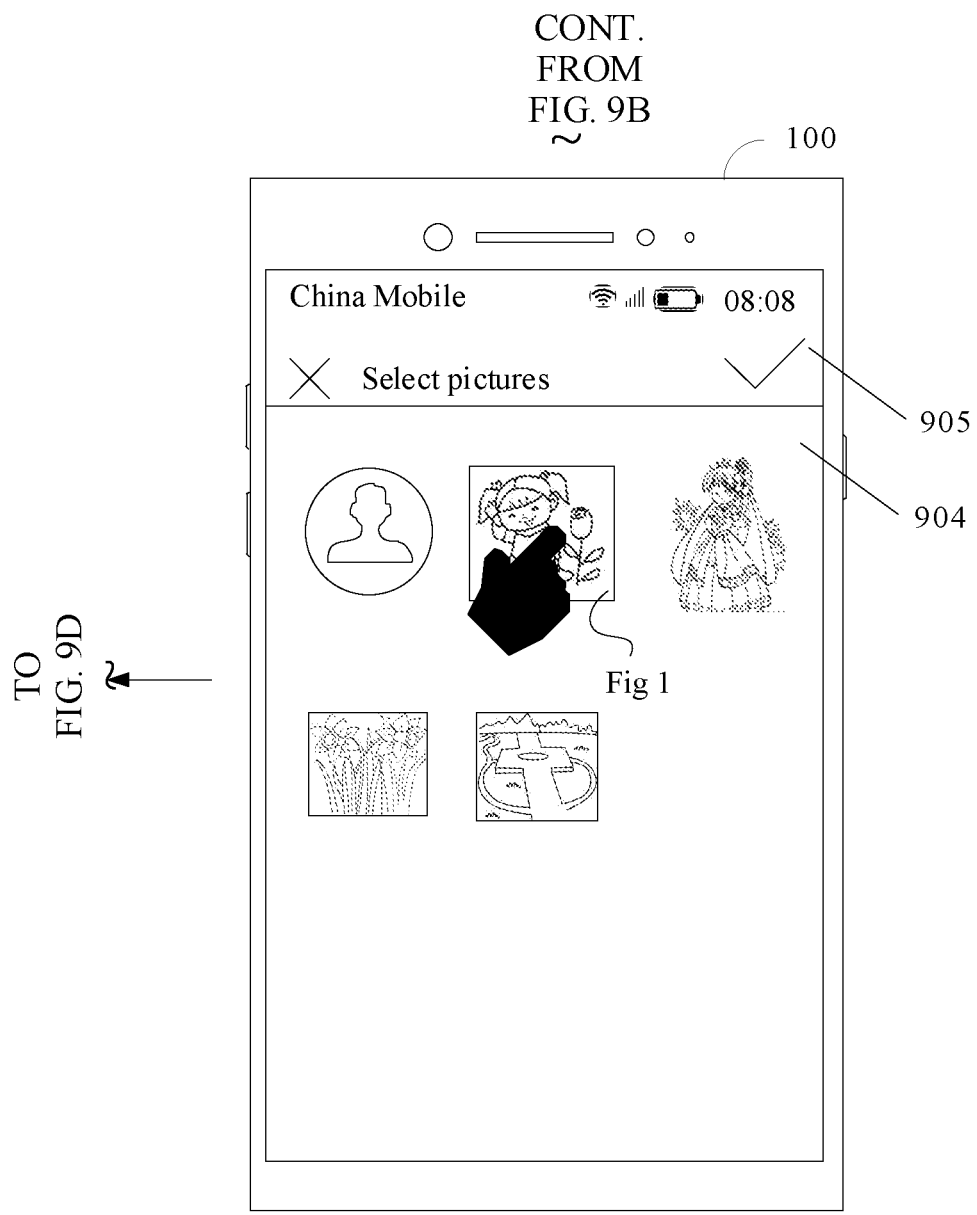
Figure 9D:
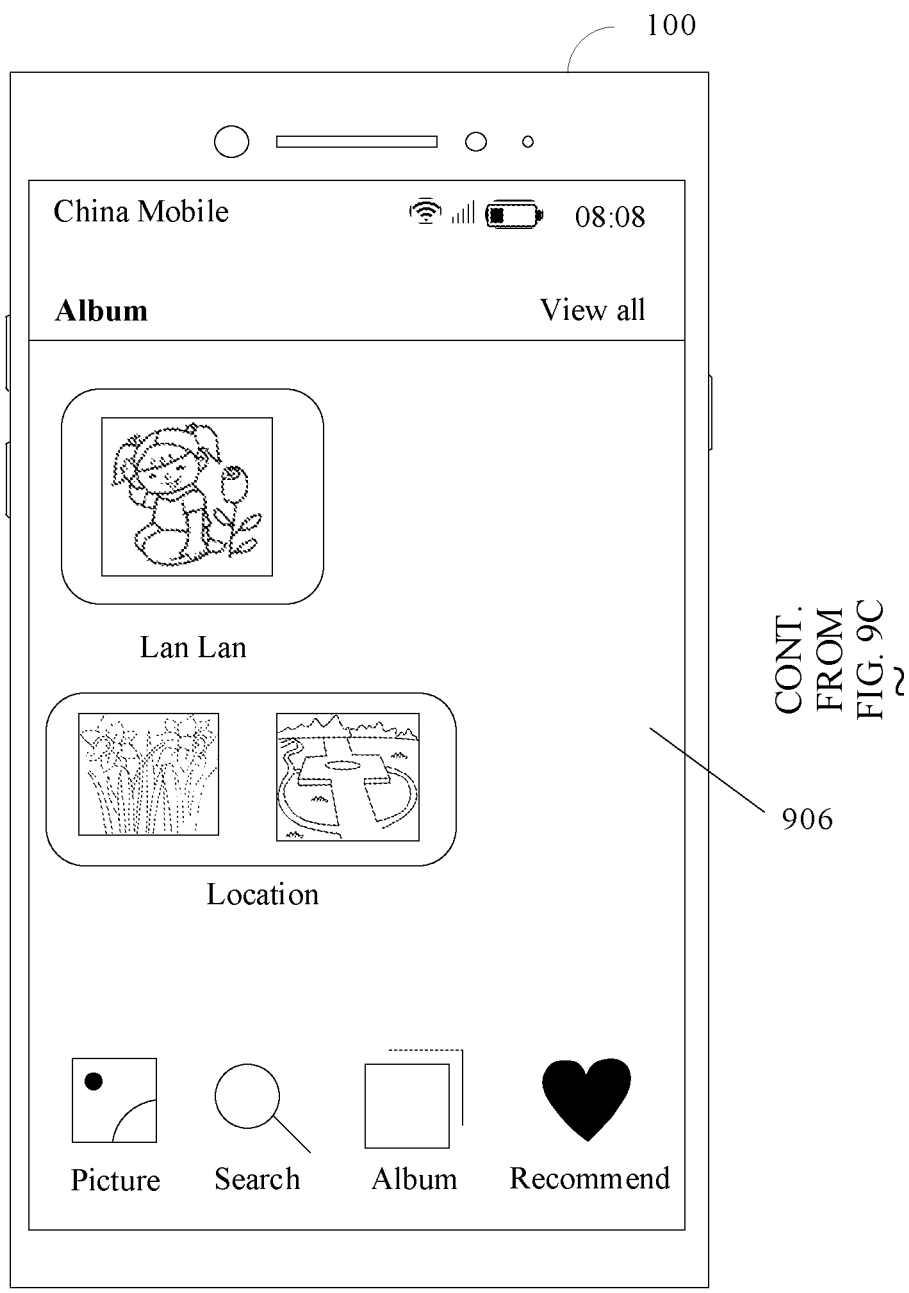

For example, when the user wants to create an album separately, the user may tap a control "New album" 901 in an interface shown in FIG. 9A. In response to an operation of tapping the "New album" 901 by the user, the mobile phone 100 displays an interface 902 shown in FIG. 9B. The interface 902 includes a pop-up box 903 of a newly created album. The user may enter a name of the newly created album in the pop-up box 903. If the newly created album is a portrait album, the user may further enter a date of birth of a person in the pop-up box 903. For example, an album name entered by the user is "Lan Lan", and a date of birth is "2014-10-1". After the user taps the confirm button in the pop-up box 903, the mobile phone 100 displays an interface 904 shown in FIG. 9C. The interface 904 displays all pictures in the gallery, so that the user selects a picture for the album "Lan Lan". The user may select only one picture as a reference picture in the album, or may select all pictures to be classified into the album "Lan Lan". In FIG. 9C, an example in which the user selects the FIG. 1 is used for description. In response to an operation of tapping a button 905 in the interface 904 by the user, the mobile phone 100 may display an interface 906 shown in FIG. 9D. The album "Lan Lan" has been successfully created.

After creating the album, the mobile phone 100 may recognize/obtain all pictures including the portrait (for example, pictures including Lan Lan) selected by the user, calculate an age of the person in each picture based on a photographing time of each picture and the obtained date of birth, and store the portrait and the age in each picture in the memory.

If the user selects only one picture as the reference picture in the album, the mobile phone 100 may further determine that another picture including the portrait in the gallery also belongs to the album. Subsequently, if a picture of the portrait is newly added in the mobile phone 100, the mobile phone 100 may also determine that the newly added picture belongs to the album, and calculate and store an age of the person in the newly added picture.

For example, with reference to FIG. 9A to FIG. 9D, the user selects the FIG. 1 as the reference picture of the album "Lan Lan". Subsequently, the mobile phone 100 may recognize all pictures of Lan Lan in the gallery, calculate an age of Lan Lan in each picture, and store the portrait "Lan Lan" and the age in each picture. Next, after the mobile phone 100 recaptures a picture of Lan Lan, the mobile phone 100 may recognize that a portrait in the picture is Lan Lan, determine that the picture belongs to the album "Lan Lan", and calculate and store an age of Lan Lan in the picture.

Certainly, in addition to the foregoing implementations, the mobile phone 100 may further obtain the two pieces of attribute information, that is, the portrait and the age, of the picture including the portrait in another manner. Details are not described herein.

Optionally, in any one of the foregoing implementations, the mobile phone 100 may further obtain, from another installed application, such as a calendar application or a memo application, a user's date of birth recorded by the user. In this way, after the mobile phone 100 stores portrait information of a picture, the mobile phone may determine an age of a person in the picture based on information recorded in another application.

For example, the user records "Lan Lan's date of birth: Oct. 1, 2014" in the memo, and the mobile phone 100 reads the information in the memo to obtain "Lan Lan's date of birth: Oct. 1, 2014". With reference to the implementation 1, if the watermark template that has been set by the user includes "Lan Lan", and the brand "HUAWEI" and the mobile phone model "P30" of the mobile phone 100, after the mobile phone 100 captures a picture, the mobile phone 100 obtains "Lan Lan's date of birth: Oct. 1, 2014" based on "Lan Lan" in the watermark template and a photographing time, and determines an age of the person in the picture. In this way, the mobile phone 100 can store the two pieces of attribute information, that is, the portrait and the age, of the picture. With reference to the foregoing implementation 2, implementation 3, and implementation 4, if the information entered in the label information/the note information/the newly created album only includes "Lan Lan", after the mobile phone 100 captures a picture, the mobile phone 100 obtains "Lan Lan's date of birth: Oct. 1, 2014" based on the information "Lan Lan" entered in the label information/the note information/the newly created album and a photographing time, and determines an age of the person in the picture. In this way, the mobile phone 100 can store the two pieces of attribute information, that is, the portrait and the age, of the picture.

For a picture transmitted by another device (for example, transmitted by BLUETOOTH) or a social application (for example, WECHAT or QQ) to the mobile phone 100, a device capturing the picture may obtain and store the two pieces of attribute information, that is, the portrait and the age, of the picture by using any one of the foregoing implementations. In a process of transmitting a picture to the mobile phone 100, the two pieces of attribute information, that is, the portrait and the age, of the picture is also transmitted to the mobile phone 100. In this way, the attribute information of the picture obtained by the mobile phone 100 includes the portrait and the age.

S402: The mobile phone 100 groups pictures based on portraits and ages to generate and display a person album of each portrait and at least one age album of each portrait.

After obtaining the two pieces of attribute information, that is, the portrait and the age, of the picture, the mobile phone 100 may divide pictures of a same portrait into one group, and these groups of pictures form a person album. The mobile phone 100 further divides pictures of a same portrait into at least one group based on ages. Herein, each group of pictures form an age album.

In addition, the mobile phone 100 further stores a mapping relationship between a portrait, an age, a picture group (that is, an album), and a picture. For the mapping relationship, refer to FIG. 3.

After generating each age album, the mobile phone 100 may display pictures in the album in descending order or ascending order of photographing times. Certainly, the user may further adjust a display sequence of the pictures in the album as required.

Figure 5A:
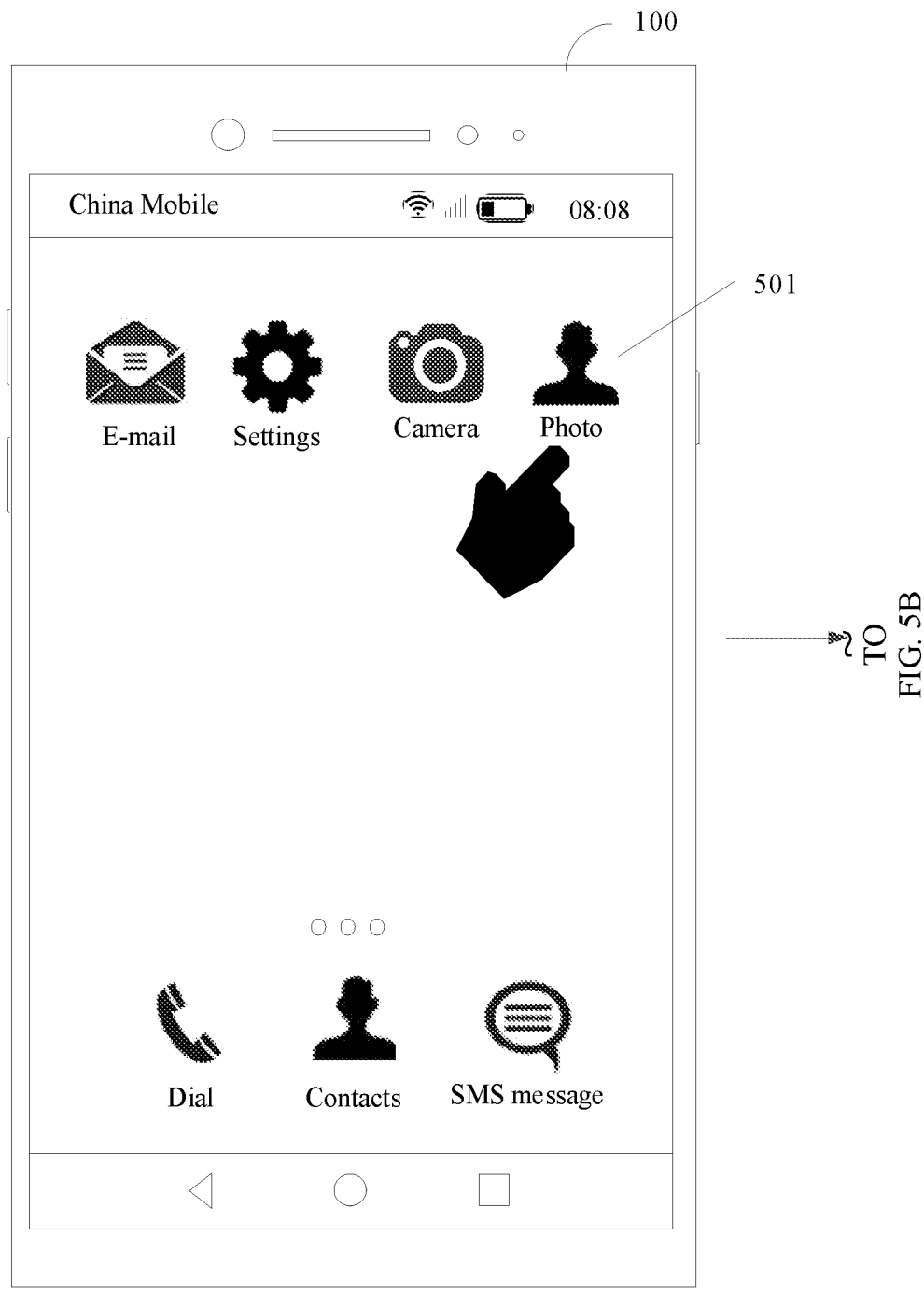
FIG. 5A, FIG. 5B, FIG. 5C, FIG. 5D, and FIG. 5E are schematic diagrams of instances of display interfaces according to an embodiment of this application.
Figure 5B:
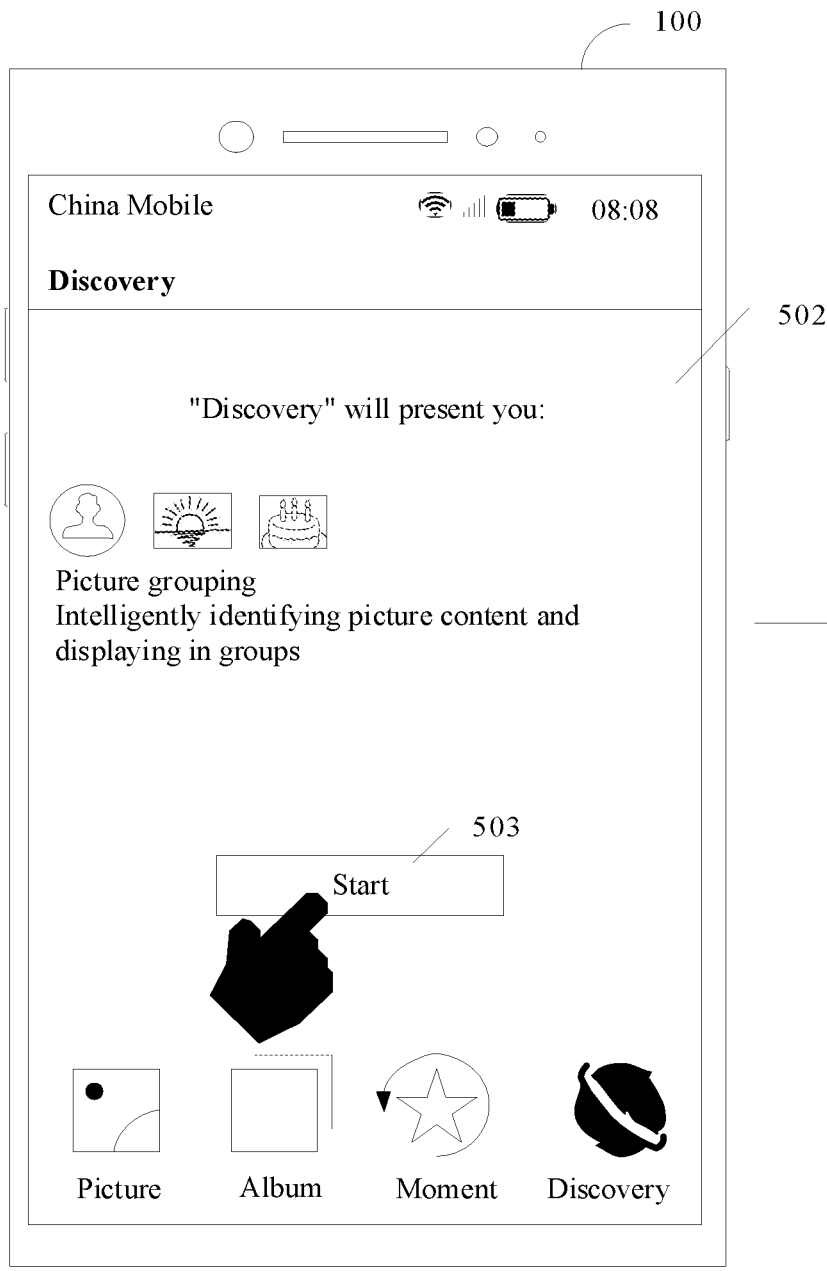
Figure 5C:
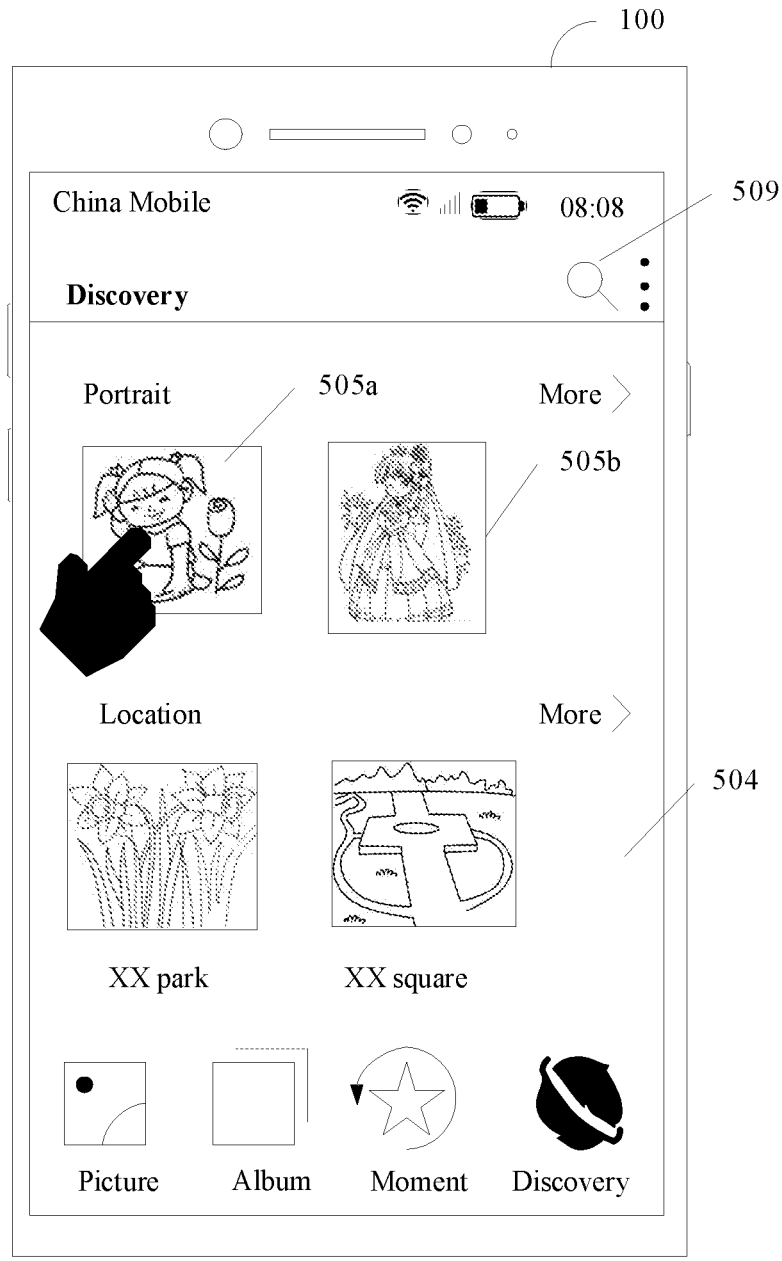
Figure 5D:
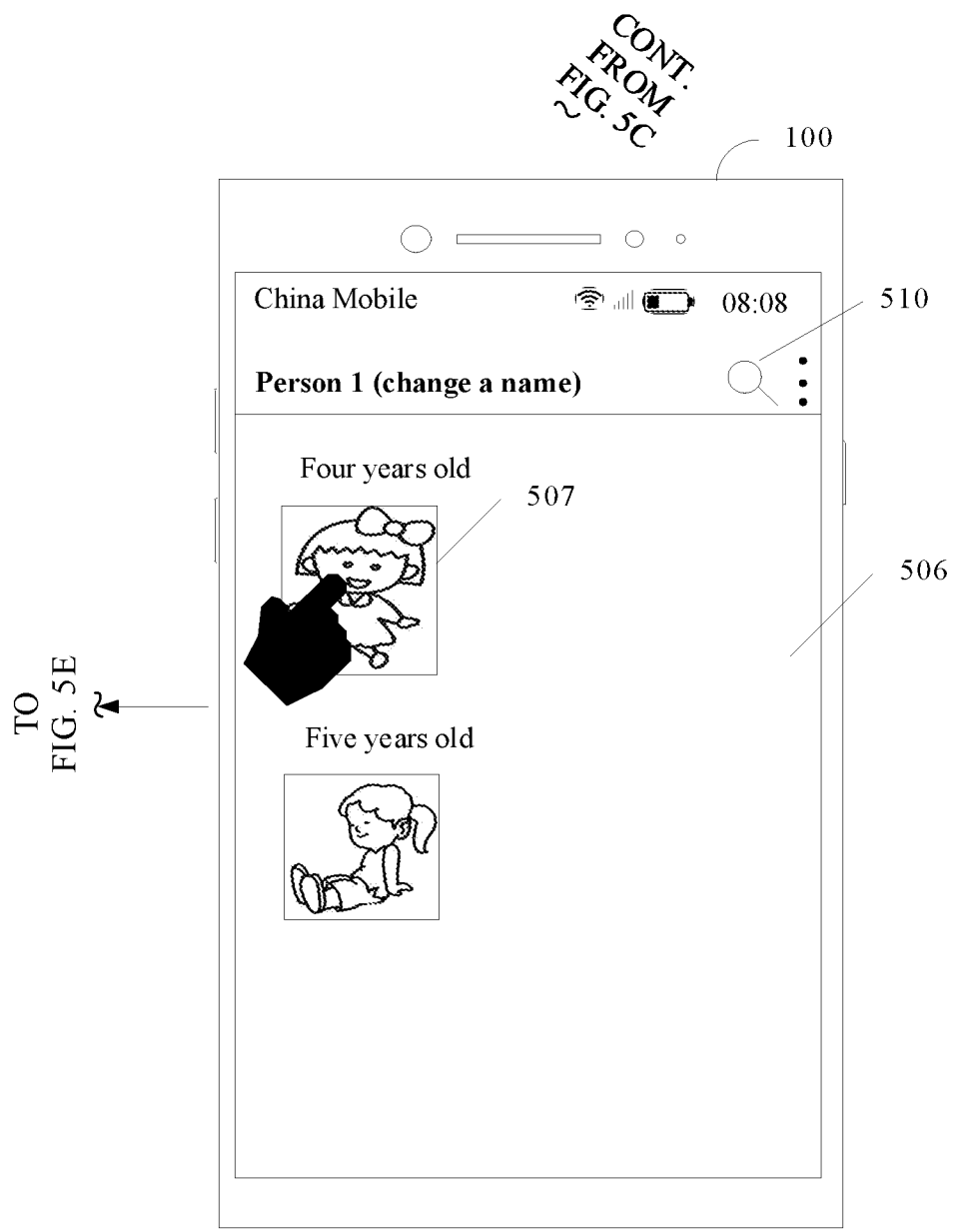
Figure 5E:
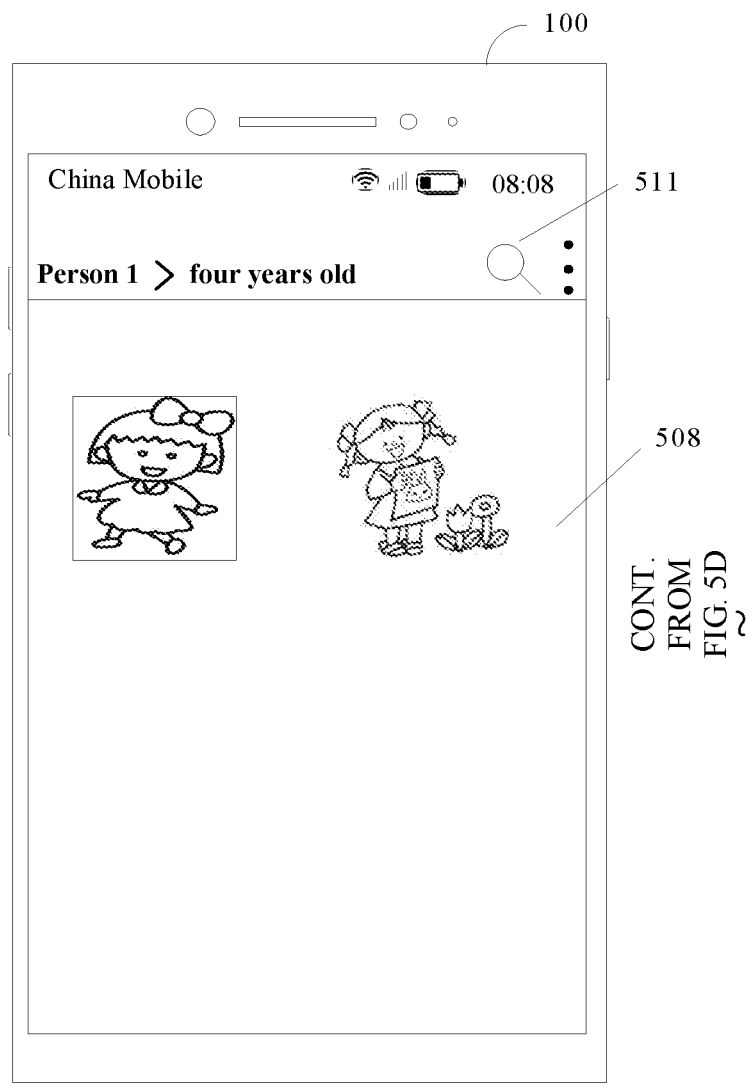

In an example, after the user taps an icon 501 of the "Photo" application shown in FIG. 5A, the mobile phone 100 may display a display interface 502 of the "Discovery" option shown in FIG. 5B. The interface 502 includes a function button 503 used to control the mobile phone 100 to group the plurality of pictures in the gallery based on different dimensions, for example a "Start" button 503. After receiving the tapping operation of the user on the "Start" button 503, the mobile phone 100 may perform S401 and S402 in response to the tapping operation of the user, and generate and display an interface 504 shown in FIG. 5C. The interface 504 includes an icon of each person album. The icon may be displayed as any picture in the album, or may be displayed as a picture that is set by the user as a cover. For example, the interface 504 shown in FIG. 5C includes an icon 505*a* of an album of a person 1 and an icon 505*b* of an album of a person 2. Certainly, the interface 504 may further display another album generated through division based on another dimension such as a photographing location. After the user taps the icon 505*a* of the album of the person 1 in the interface 504, the mobile phone 100 displays a next level of album, that is, an age album, of the album of the person 1 shown by the icon 505*a*, and the mobile phone 100 displays an interface 506 shown in FIG. 5D. The interface 506 includes an icon 507 of the album of the person 1 at four years old and an icon of the album of the person 1 at five years old. Further, after the user taps the icon 507, the mobile phone displays an interface 508 in response to the tapping operation on the icon 507, and the interface 508 displays the pictures of the person 1 at four years old in a sequence of photographing times.

Figure 5F:
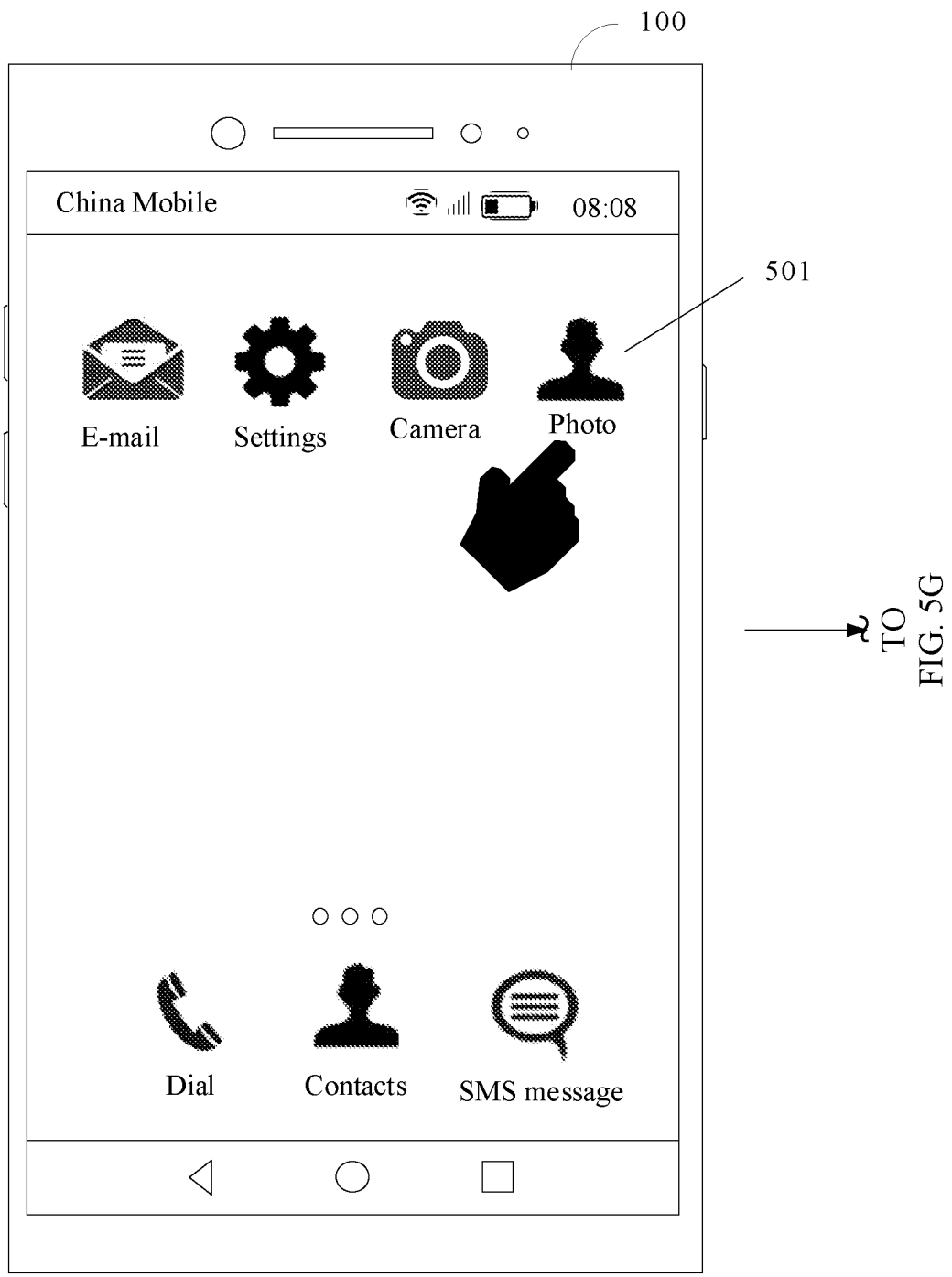
FIG. 5F, FIG. 5G, FIG. 5H, FIG. 5I, FIG. 5J, and FIG. 5K are schematic diagrams of instances of display interfaces according to an embodiment of this application.
Figure 5G:
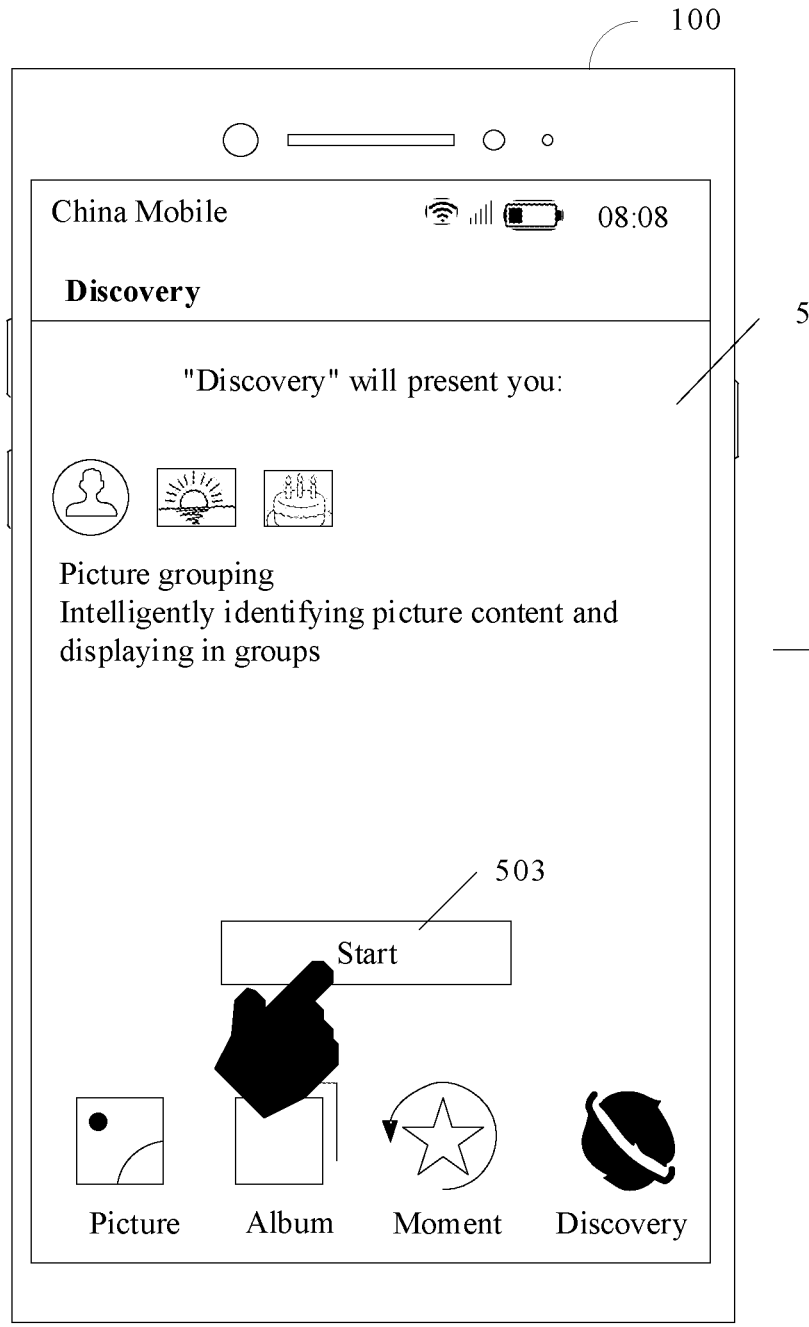
Figure 5H:
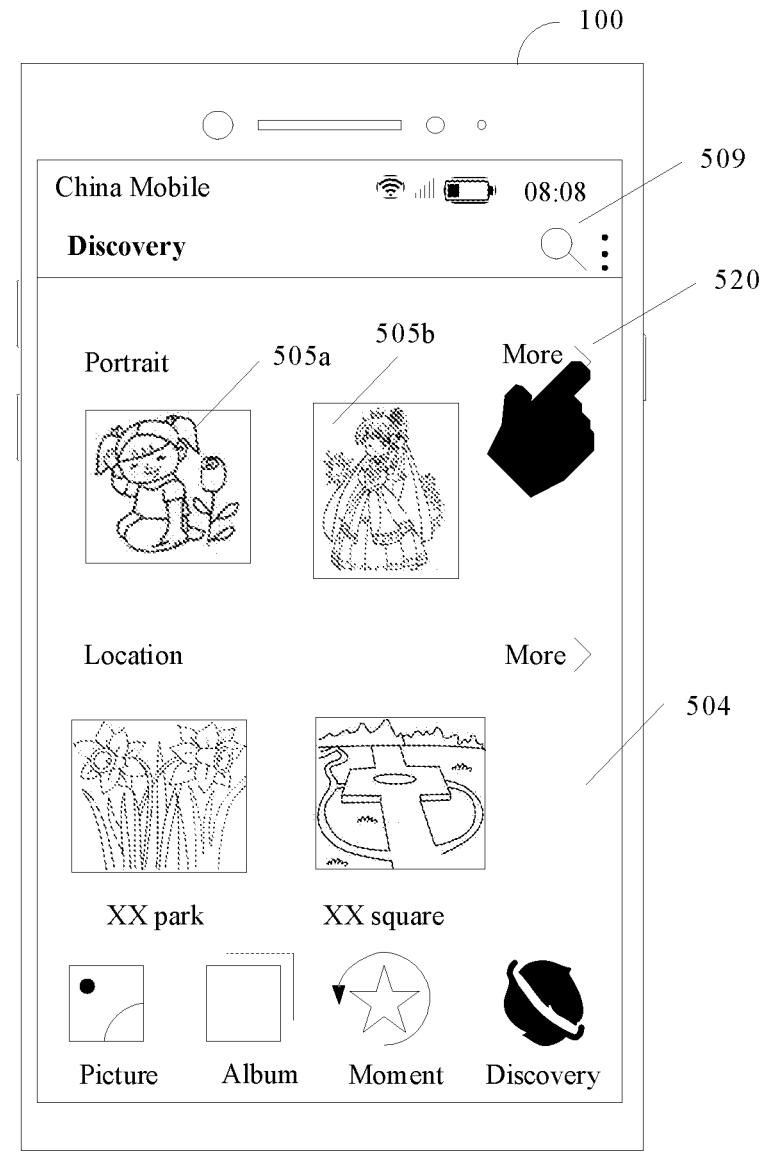
Figure 5I:
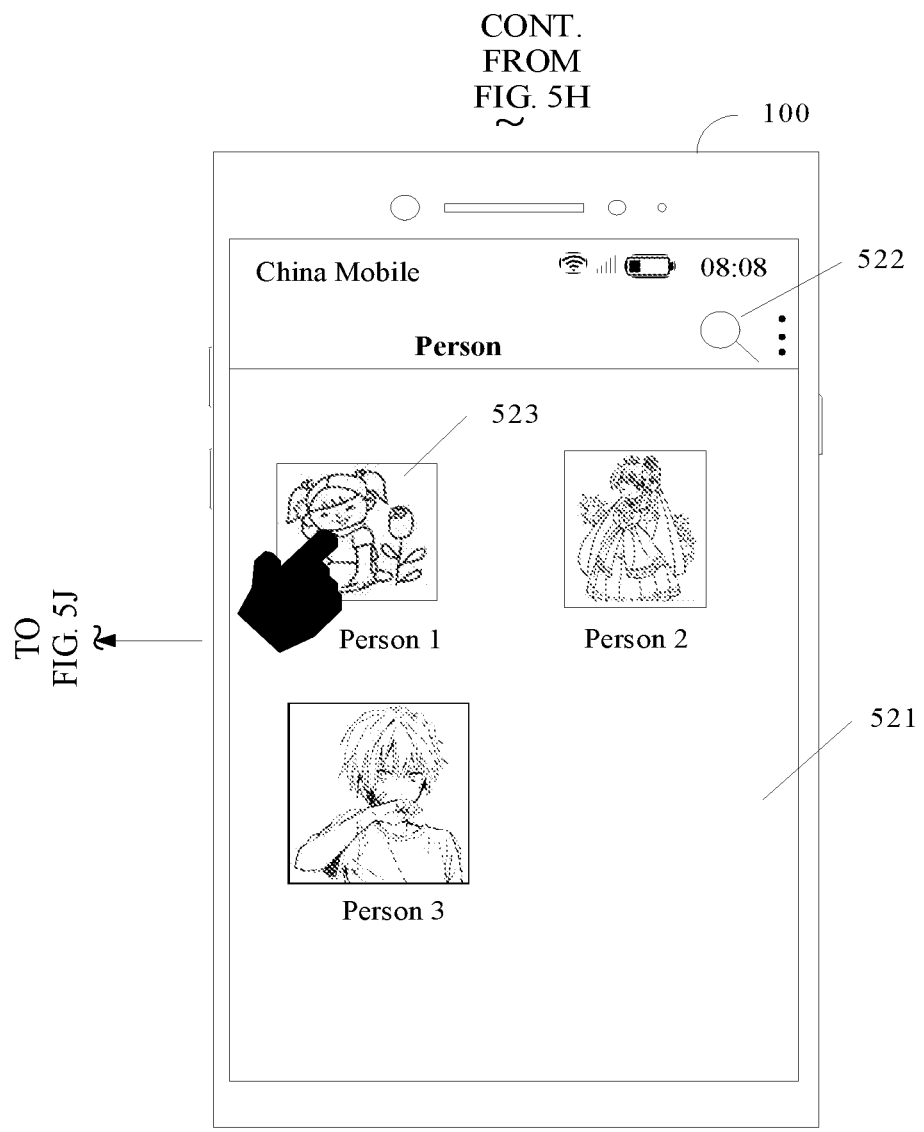
Figure 5J:
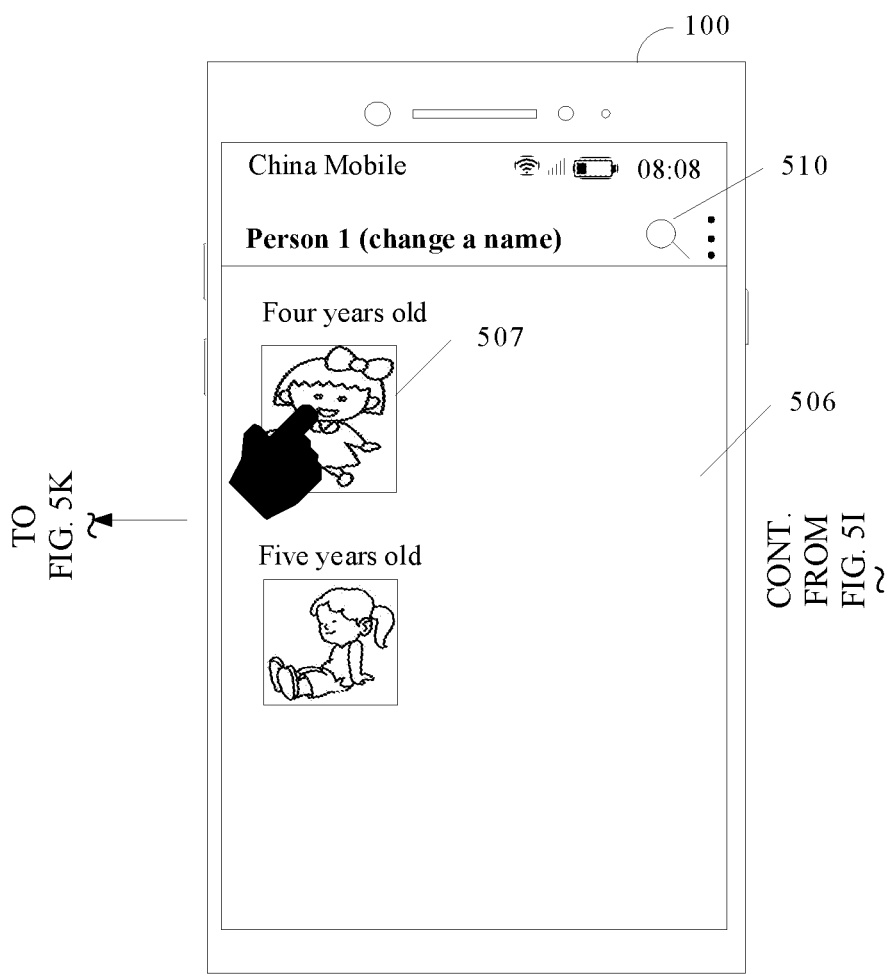
Figure 5K:
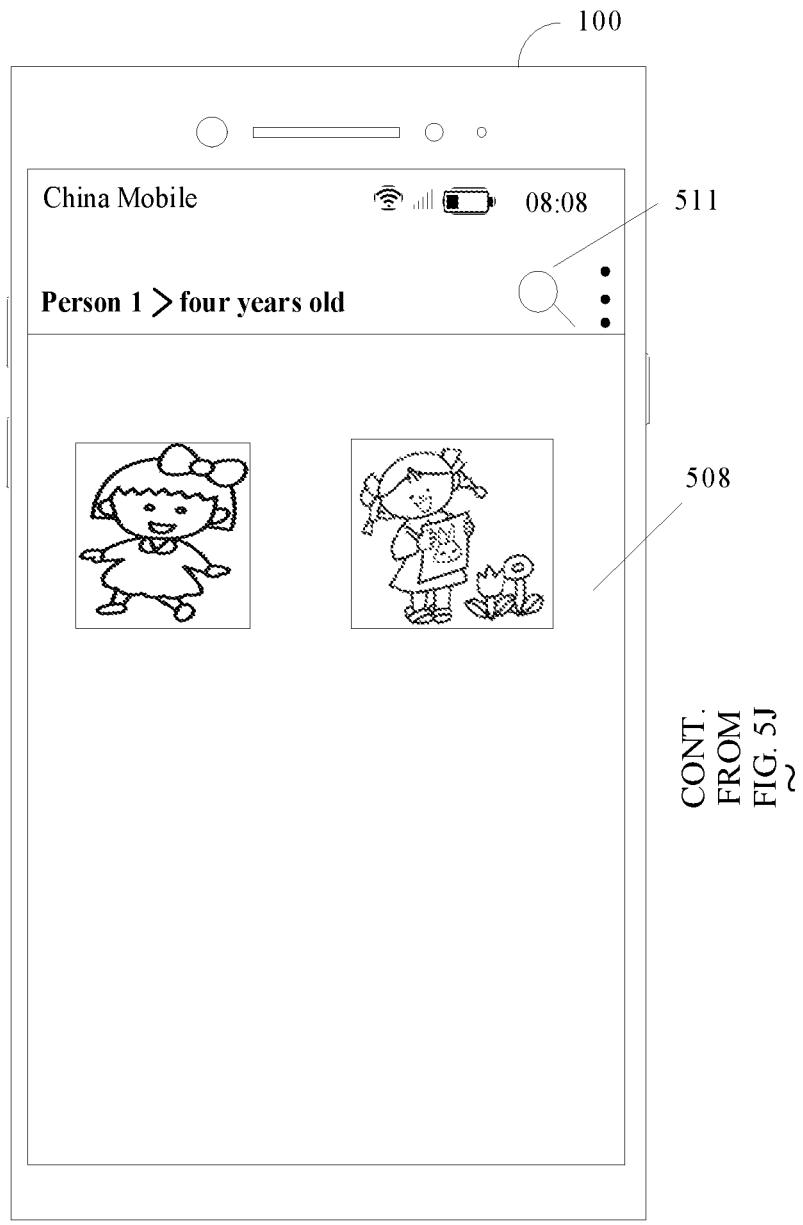

In addition, as shown in FIG. 5H, for the interface 504, the user may further tap an icon 520 that is in the interface 504 and that is used to view more person albums. In response to the tapping operation on the icon 520, the mobile phone displays an interface 521 shown in FIG. 5I. The interface 521 displays icons of all person albums generated by the mobile phone 100. The user may tap an icon of any person album in the interface 521, so that the mobile phone 100 displays a next level of album of the person album. For a subsequent procedure of FIG. 5I, refer to the description of FIG. 5A to FIG. 5E. Details are not described herein again. For FIG. 5F, FIG. 5G, FIG. 5I, and FIG. FIG. 5K, refer to the descriptions of FIG. 5A, FIG. 5B, FIG. 5D, and FIG. 5E. Details are not described herein again.

Figure 10A:
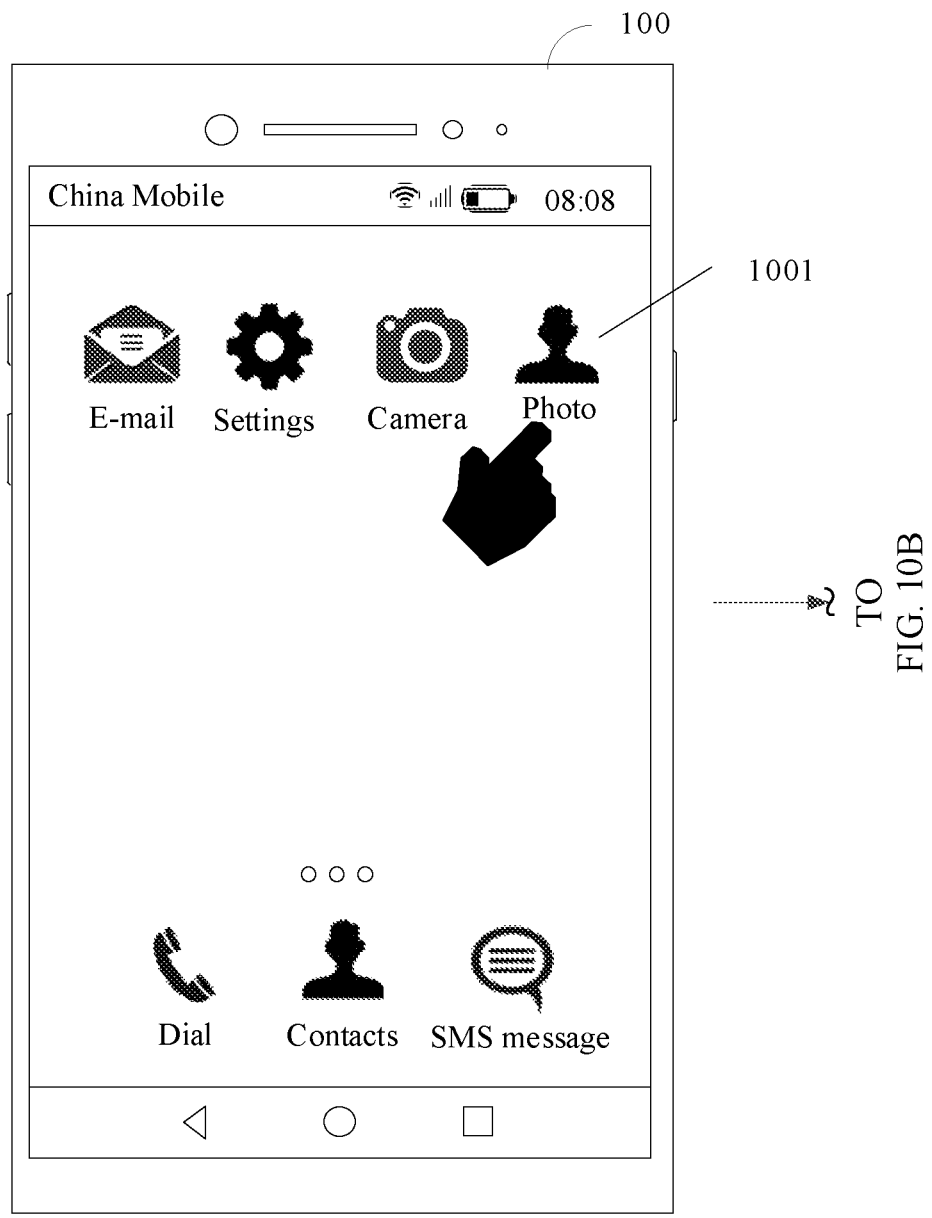
FIG. 10A and FIG. 10B are schematic diagrams of instances of display interfaces according to an embodiment of this application.
Figure 10B:
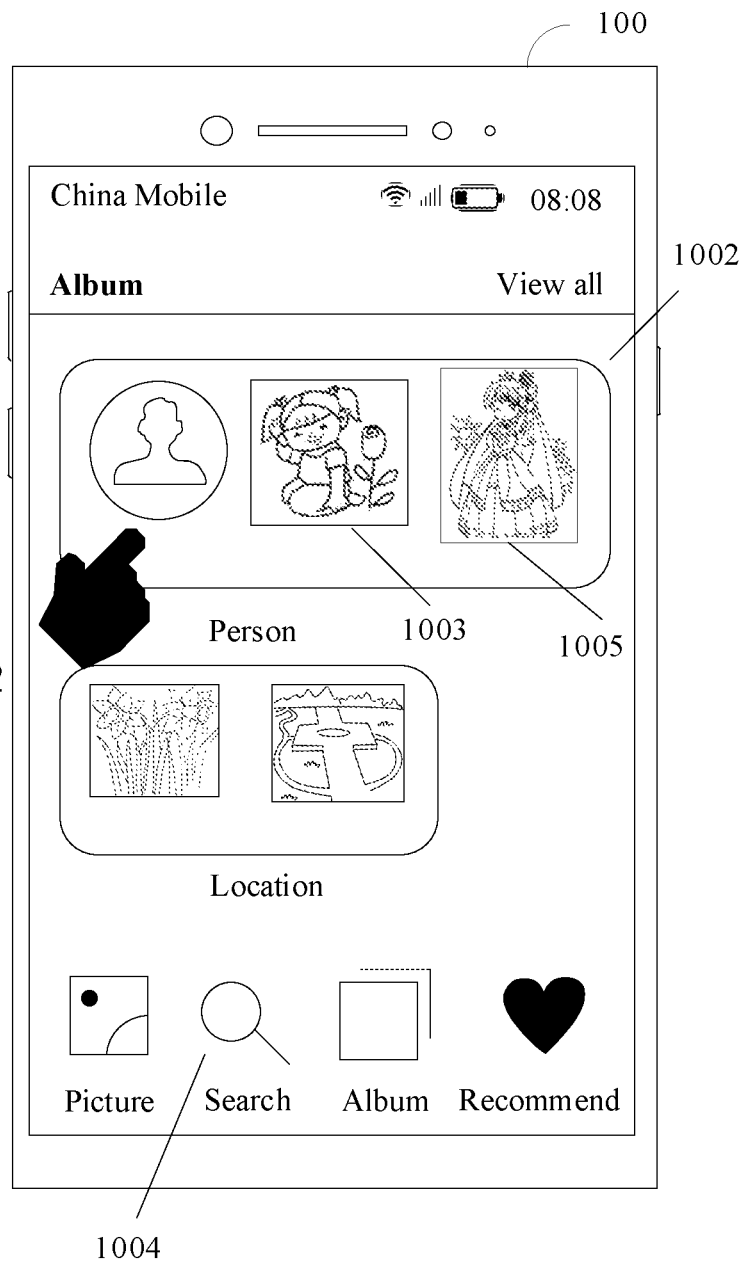

In another example, the mobile phone 100 performs S401 and S402 without being perceived by the user, to generate a person album of each portrait and at least one age album of each portrait. After the user taps an icon 1001 of the "Photo" application shown in FIG. 10A, the mobile phone 100 may display a display interface 1002 of an "Album" option shown in FIG. 10B. The interface 1002 includes an icon of each person album. The icon may be displayed as any picture in the album, or may be displayed as a picture that is set by the user as a cover. For example, the interface 1002 shown in FIG. 10B includes an icon 1003 of an album of a person 1 and an icon 1005 of an album of a person 2. Certainly, the interface 1002 may further display another album generated through division based on another dimension such as a photographing location. After the user taps the icon 1003 in the interface 1002, the mobile phone 100 may display the interface shown in FIG. 5D. Next, in response to an operation of the user, the mobile phone 100 may display the interface shown in FIG. 5E.

In the embodiments of this application, an age album generated by the mobile phone 100 may alternatively include pictures at a plurality of ages of a same portrait (for example, an age group). For example, age albums of a user A that are generated by the mobile phone 100 include a kindergarten album, an elementary school album, a junior high school album, a high school album, and a college album.

In the embodiments of this application, the mobile phone 100 may divide the pictures in the gallery based only on ages, to generate age albums. Each age album may include an album of different portraits at a same age.

Alternatively, the mobile phone 100 may divide the pictures in the gallery based on photographing locations of the pictures and ages. Further, pictures of a same photographing location and different ages are classified as one group, to generate a story album/commemorative album as a collection of pictures of the user at the photographing location. For example, if the user takes photos at a location A every year, the mobile phone 100 classifies the photos into one group, to generate a story album. The user can view the story album, and can feel the change of years.

Alternatively, the mobile phone 100 may determine whether a photographing time of a picture is a specific date, for example, a birthday. If the photographing time of the picture is a specific date, the mobile phone 100 may classify all pictures taken on the specific date into one group, to generate an album of the specific date, for example, a birthday album.

In addition to the album mentioned above, the mobile phone 100 may further display, in a manner such as a video, pictures classified into one group.

It should be noted that the mobile phone 100 may further divide the pictures in the gallery based on another dimension, and generate an album/video by using the pictures divided into one group. Details are not described one by one in the embodiments of this application.

For a picture newly added to the mobile phone 100, the mobile phone 100 may obtain attribute information such as a portrait and an age of the picture, and establish a mapping relationship between the picture and one or more established albums based on the attribute information such as the portrait and the age of the picture, to add the picture to the one or more albums.

In the embodiments of this application, the mobile phone 100 may divide the pictures in the gallery based on ages, to generate at least one age album. By viewing the age album, the user can experience the changes of features such as dress and portrait as time passes by.

After the age album is generated, the user may trigger the mobile phone 100 to search for a picture corresponding to a first age or search for a picture of a first portrait at a first age.

Next, an example in which the user triggers the mobile phone 100 to search for a picture in the gallery in which an age of a person is four years old (corresponding to the first age in the embodiments of this application) is used for description.

Figure 11:
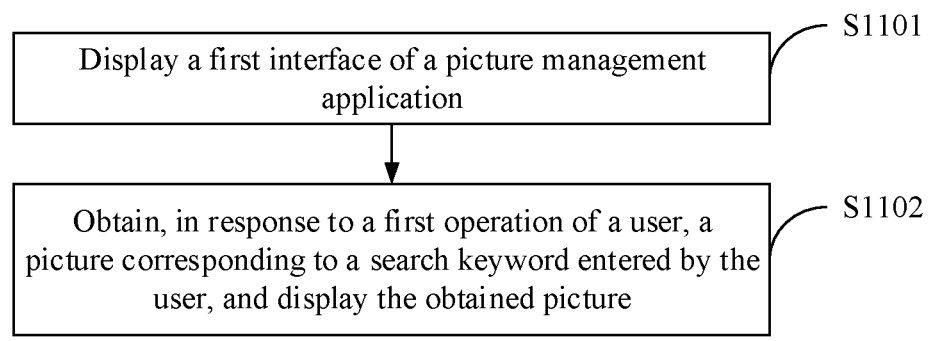
FIG. 11 is a schematic flowchart of a picture search method according to an embodiment of this application.

FIG. 11 is a schematic flowchart of a picture search method according to an embodiment of this application. As shown in FIG. 11, the picture search method provided in this embodiment of this application includes the following steps.

S1101: A mobile phone 100 displays a first interface of a picture management application.

The picture management application may be a "Photo" application, "Baby album", "GOOGLE album", and another application used to manage a picture, which are not listed one by one herein.

The first interface (corresponding to a search interface in the embodiments of this application) includes a search input box. The search input box is used by a user to enter attribute information of a picture, for example, a name and an age.

The first interface may further include at least one option, where the at least one option is used to represent a dimension used by the mobile phone 100 to divide pictures in a gallery, for example, a photographing time option, a portrait (displayed by using a picture) option, a photographing location option, or an age option, and may further include a historical search information option of the user. The user may enter text information in the search input box, or may tap an option displayed in the first interface. When the user taps the option displayed in the first interface, the mobile phone 100 displays, in the search input box, information about the option tapped by the user.

Figure 12A:
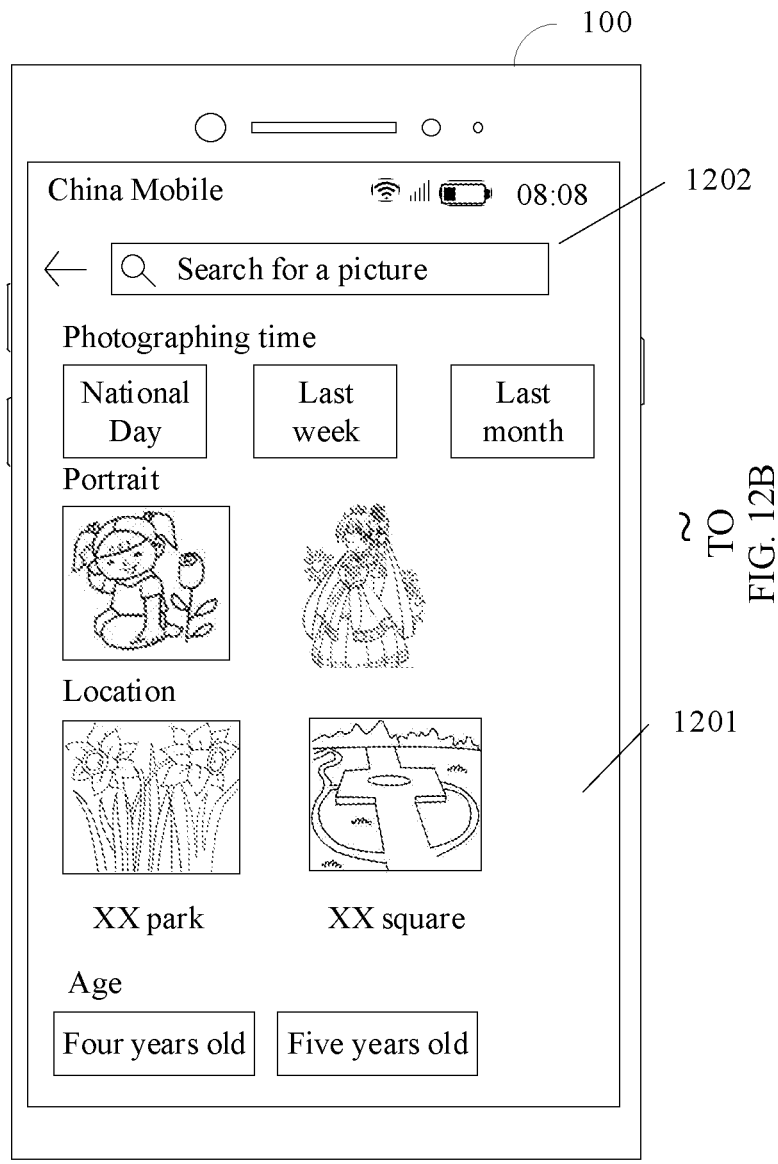
FIG. 12A and FIG. 12B are schematic diagrams 8 of instances of display interfaces according to an embodiment of this application.

In an example, the first interface is an interface 1201 shown in FIG. 12A. The interface 1201 includes a search input box 1202 and an option that is used to represent a dimension used by the mobile phone 100 to divide the pictures in the gallery, for example, a photographing time option (for example, a "National Day" option, a "Last week" option, or a "Last month" option), a portrait (which may be displayed by using a picture) option, a photographing location option (for example, an "XX park" option, an "XX square" option), an age option (for example, a "Four years old" option, or a "Five years old" option).

Figure 12B:
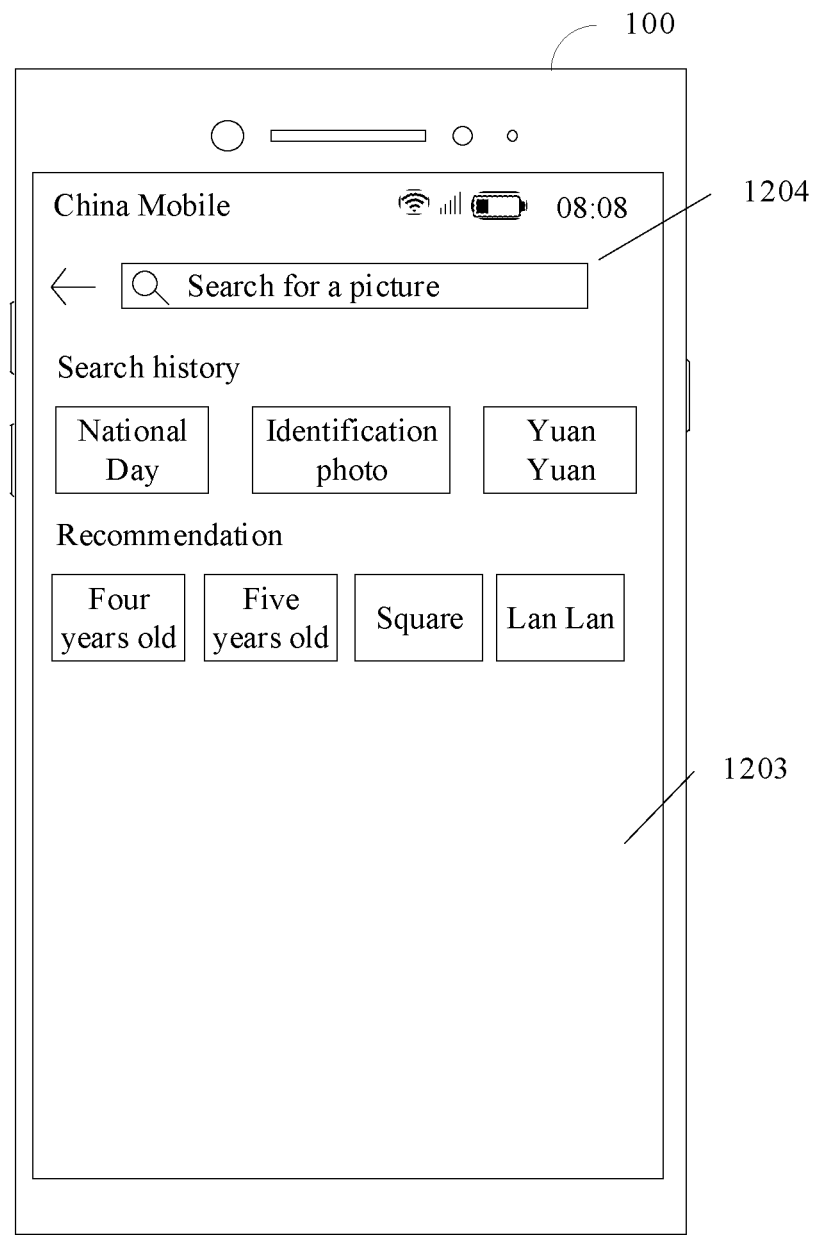

In another example, the first interface is an interface 1203 shown in FIG. 12B. The interface 1203 includes a search input box 1204, at least one historical search information option, and an option that is used to represent a dimension used by the mobile phone 100 to divide the pictures in the gallery, for example, a "National Day" option, an "Identification photo" option, a "Four years old" option, or a "Lan Lan" option.

In this embodiment of this application, the mobile phone 100 may display the first interface in response to a second operation of the user in a second interface. The second operation may be a tapping operation performed by the user on a search control in the second interface. For example, the user taps a search control 509 shown in FIG. 5C, a search control 510 shown in FIG. 5D, a search control 511 shown in FIG. 5E, a search control 522 shown in FIG. 5I, a search control 511 shown in FIG. FIG. 5K, a search icon shown in FIG. 9A to FIG. 9D, or a search control 1004 shown in FIG. 10B. In response to the tapping operation of the user, the mobile phone displays the first interface 1201 or the first interface 1203.

S1102: The mobile phone 100 obtains, in response to a first operation of the user, a picture corresponding to a search keyword (for example, a portrait 1 and four years old) entered by the user, and displays the obtained picture.

The first operation of the user may be an operation of tapping to search after the user enters the search keyword in the search input box.

Generally, after the user taps the search input box, the search input box displays a cursor used to indicate that the user may start to enter information. In this case, the user may start to enter the information in the search input box. When the mobile phone 100 does not include or have a physical keyboard, after the user taps the search input box, the mobile phone 100 may invoke an input method program in the mobile phone 100 to display a virtual keyboard used to enter information. In this case, the user may start to enter information (where the information is the search keyword) in the search input box. The user taps search after finishing entering. The mobile phone 100 searches, based on a mapping relationship (as shown in FIG. 3), for a picture matching the information entered by the user.

Figure 13A:
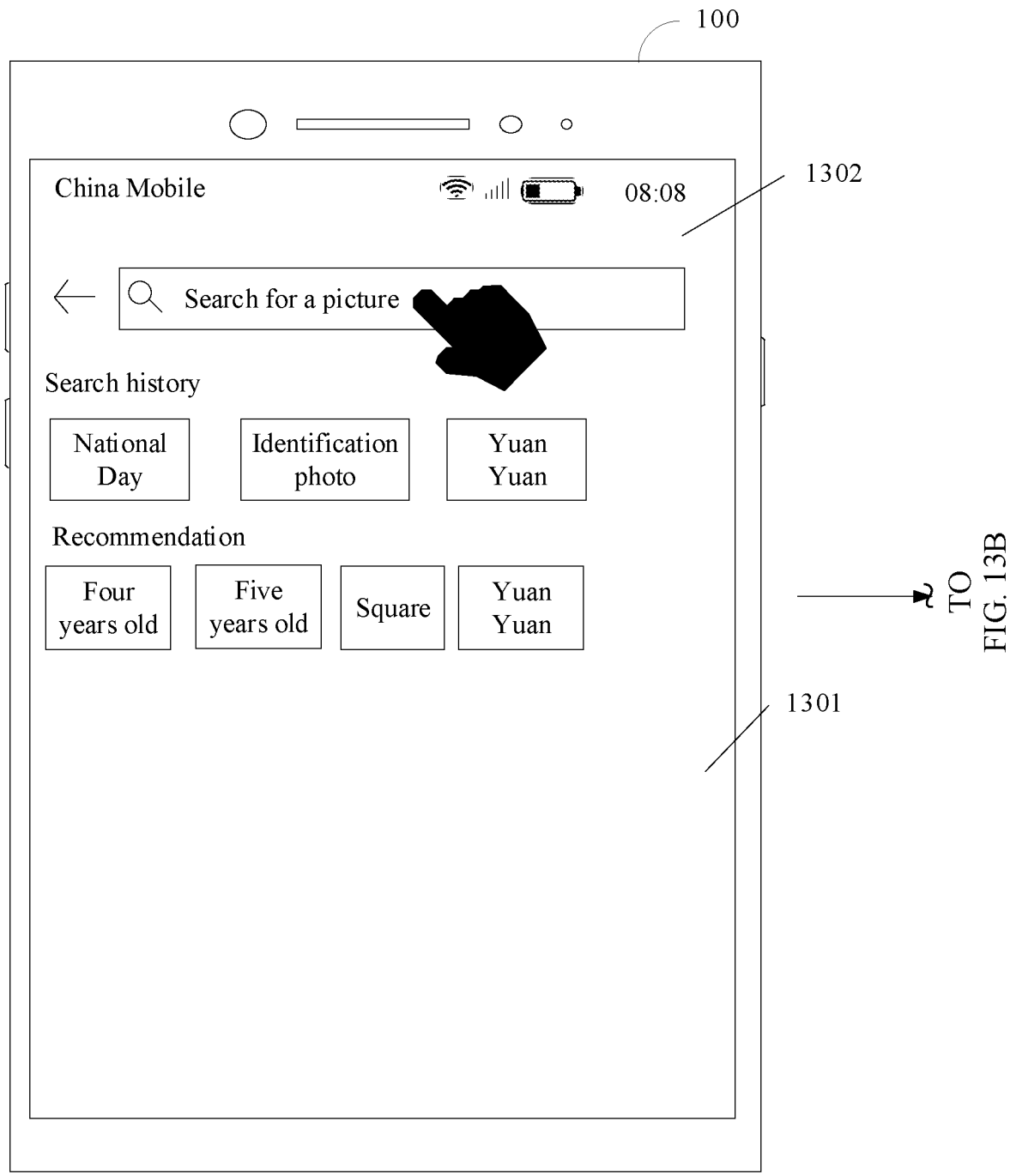
FIG. 13A, FIG. 13B, and FIG. 13C are schematic diagrams of instances of display interfaces according to an embodiment of this application.
Figure 13B:
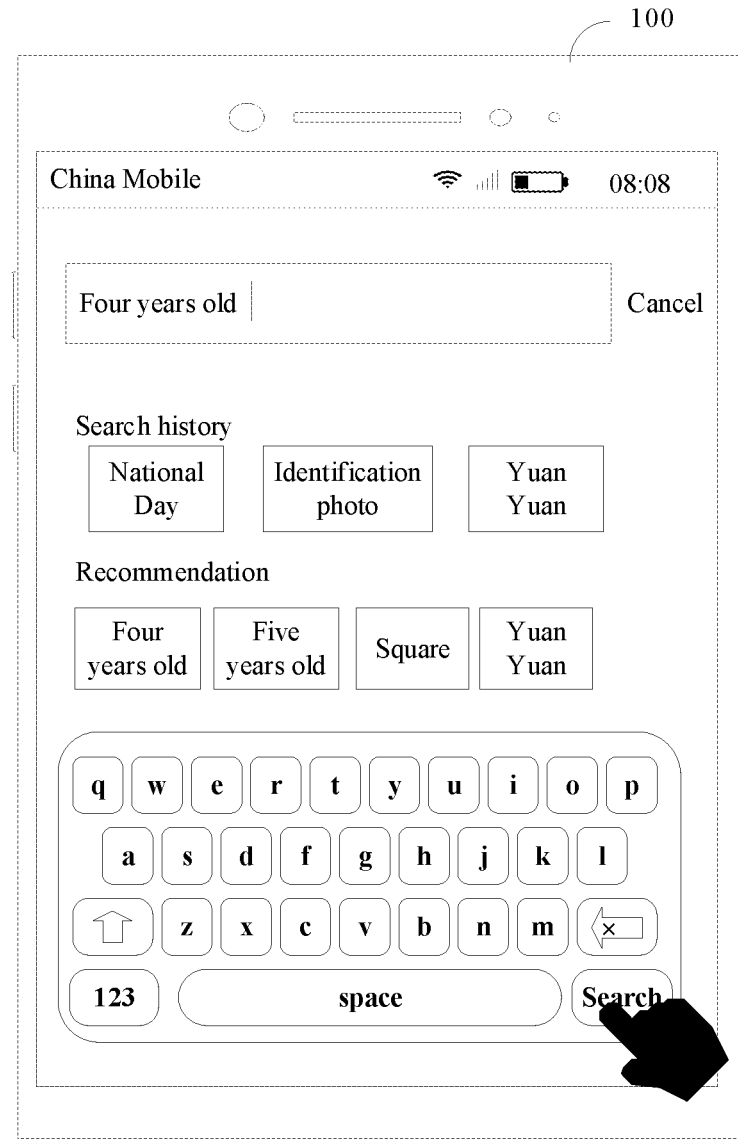
Figure 13C:

In an example, when a picture management application is a "Photo" application, the first interface may be an interface 1301 shown in FIG. 13A. The interface 1301 includes a search input box 1302. The search input box 1302 is used to input attribute information of a to-be-searched picture (for example, a name or an age of a portrait). The mobile phone 100 may receive a tapping operation performed by the user on the search input box 1302. In response to the operation, as shown in FIG. 13B, the mobile phone 100 displays a cursor in the search input box 1302, and displays a virtual keyboard. After entering "four years old" (corresponding to the first age in the first search keyword in the embodiments of this application) by using the virtual keyboard, the user may tap a search icon in the virtual keyboard (that is, the first operation). Correspondingly, the mobile phone 100 determines, from a mapping relationship in the memory in response to an operation of tapping the search icon by the user, a picture whose attribute information of an age is four years old in the gallery. If the mobile phone 100 includes a plurality of age albums of four years old, the mobile phone 100 displays each age album of four years old, and further, displays a cover picture of each age album of four years old. As shown in FIG. 13C, the mobile phone 100 displays a cover picture of an age album of "Lan Lan" at four years old and a cover picture of an age album of "Yuan Yuan" at four years old. Herein, the cover picture of the age album of "Lan Lan" at four years old and the cover picture of the age album of "Yuan Yuan" at four years old may respectively correspond to a first picture and a second picture in the embodiments of this application.

Alternatively, if the mobile phone 100 includes one age album of four years old, the mobile phone 100 directly displays all pictures in the age album.

Figure 13D:
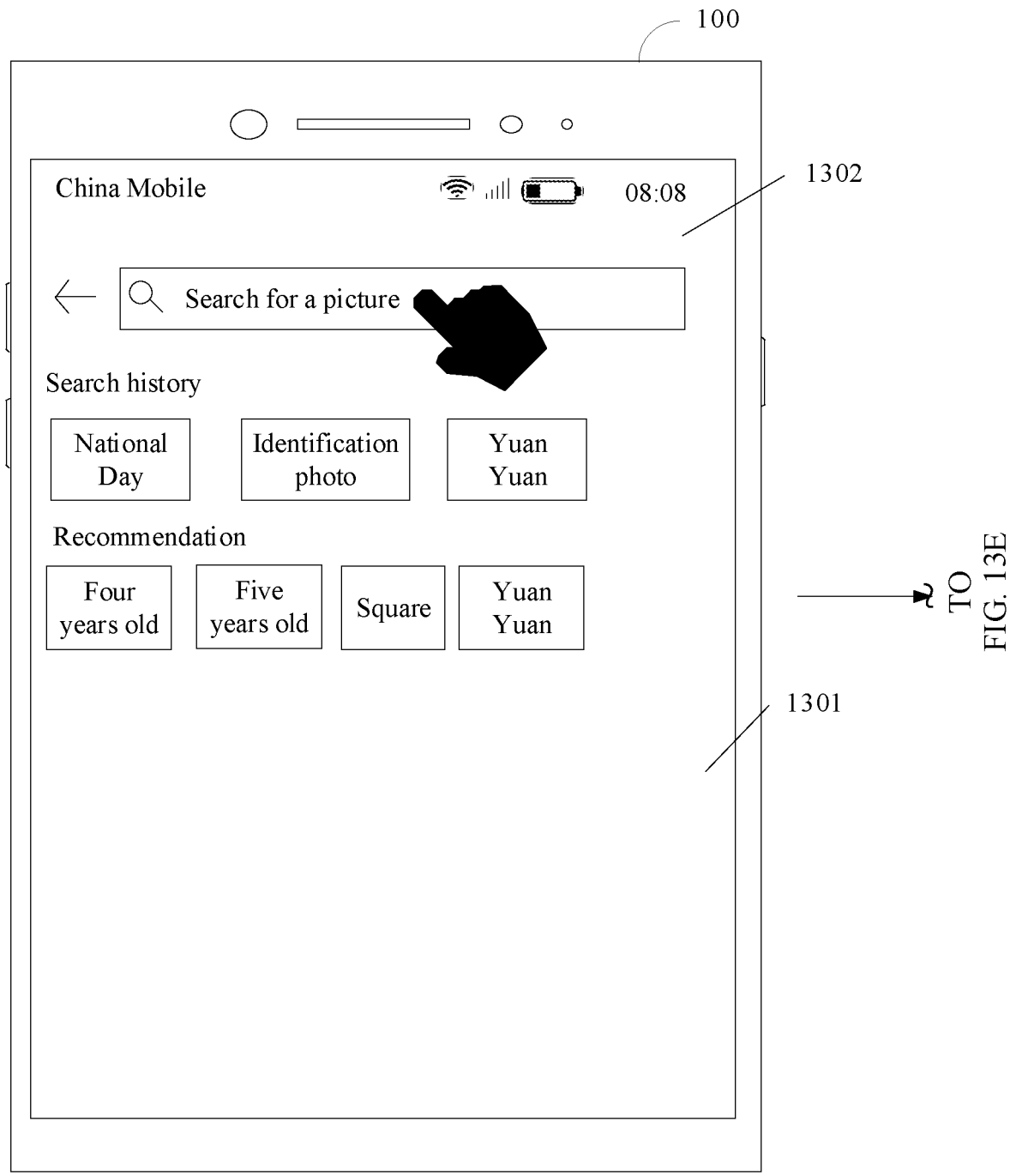
FIG. 13D, FIG. 13E, and FIG. 13F are schematic diagrams of instances of display interfaces according to an embodiment of this application.
Figure 13E:
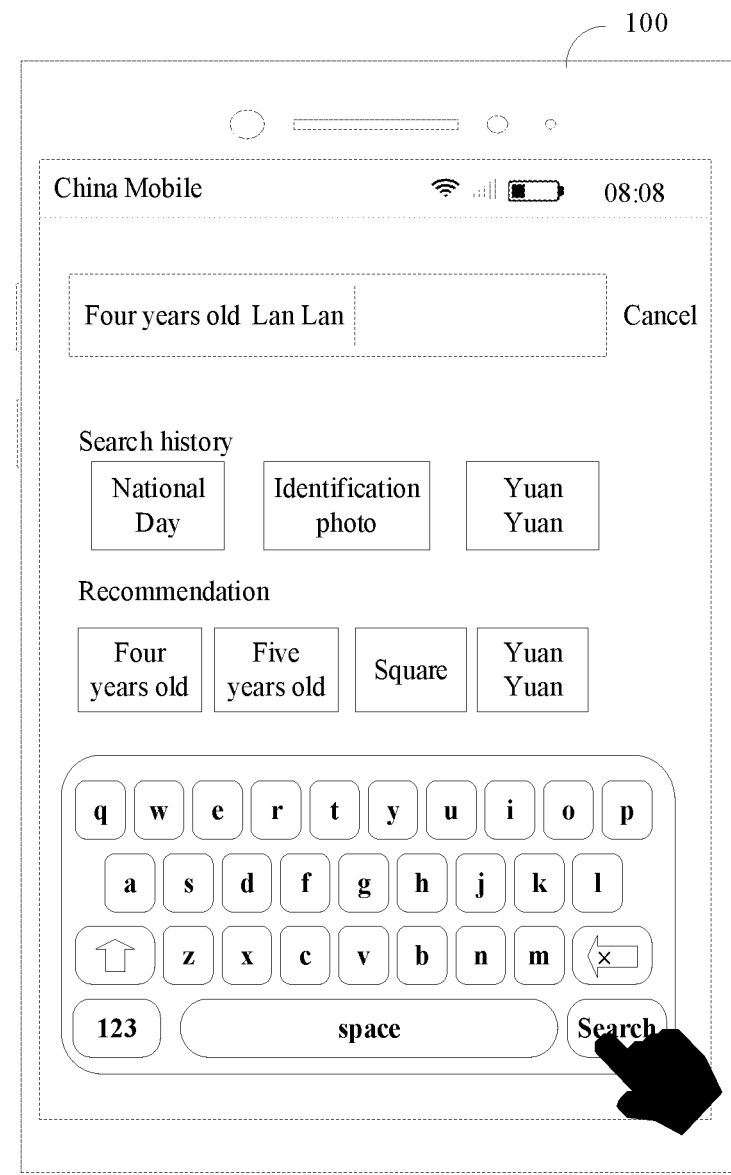
Figure 13F:
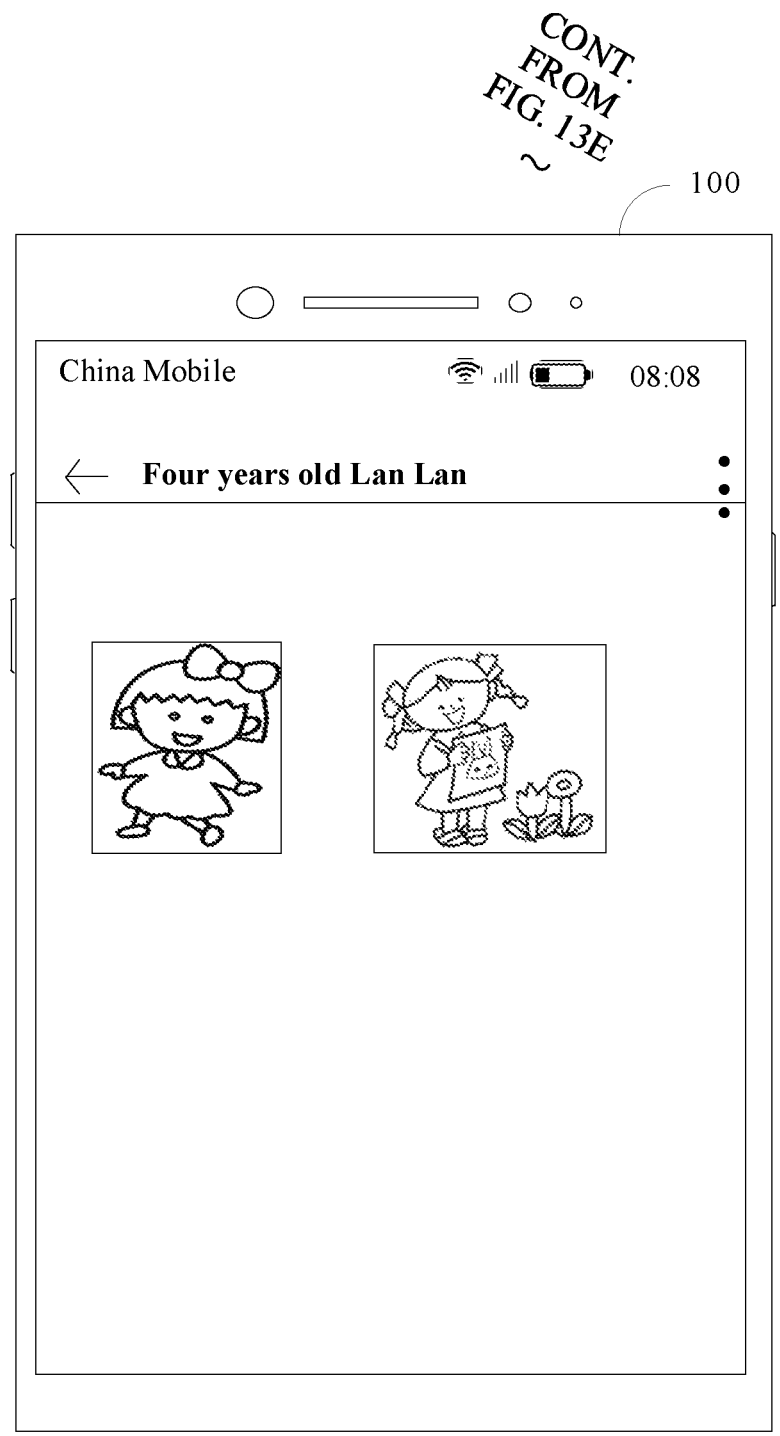

In another example, as shown in FIG. 13E, the mobile phone 100 displays a cursor in the search input box 1302, and displays a virtual keyboard. After entering "four years old Lan Lan" (corresponding to the first age and the first person in the second search keyword in the embodiments of this application) by using the virtual keyboard, the user may tap a search icon in the virtual keyboard (that is, the first operation). Correspondingly, the mobile phone 100 determines, from a mapping relationship in the memory in response to an operation of tapping the search icon by the user, a picture whose attribute information of an age is four years old and whose attribute information of a portrait is Lan Lan in the gallery. Subsequently, the mobile phone 100 may display a cover picture of an age album of "Lan Lan" at four years old, or may display all pictures of "Lan Lan" at four years old. As shown in FIG. 13F, the mobile phone 100 displays all pictures of "Lan Lan" at four years old. In the embodiments of this application, each picture of Lan Lan at four years old shown in FIG. 13F is a picture matching the second search keyword. FIG. 13D is the same as FIG. 13A. Details are not described herein again.

Alternatively, the first operation of the user is a tapping operation of the user on one or more options in the first interface.

The first interface may include at least one option. After the user taps any one/more options in the at least one option (where information about the option tapped by the user is considered as a search keyword entered by the user in the search input box), the mobile phone 100 displays, in the search input box, the information about the option tapped by the user, searches for a picture matching the information about the option tapped by the user, and displays the found picture.

Figure 14A:
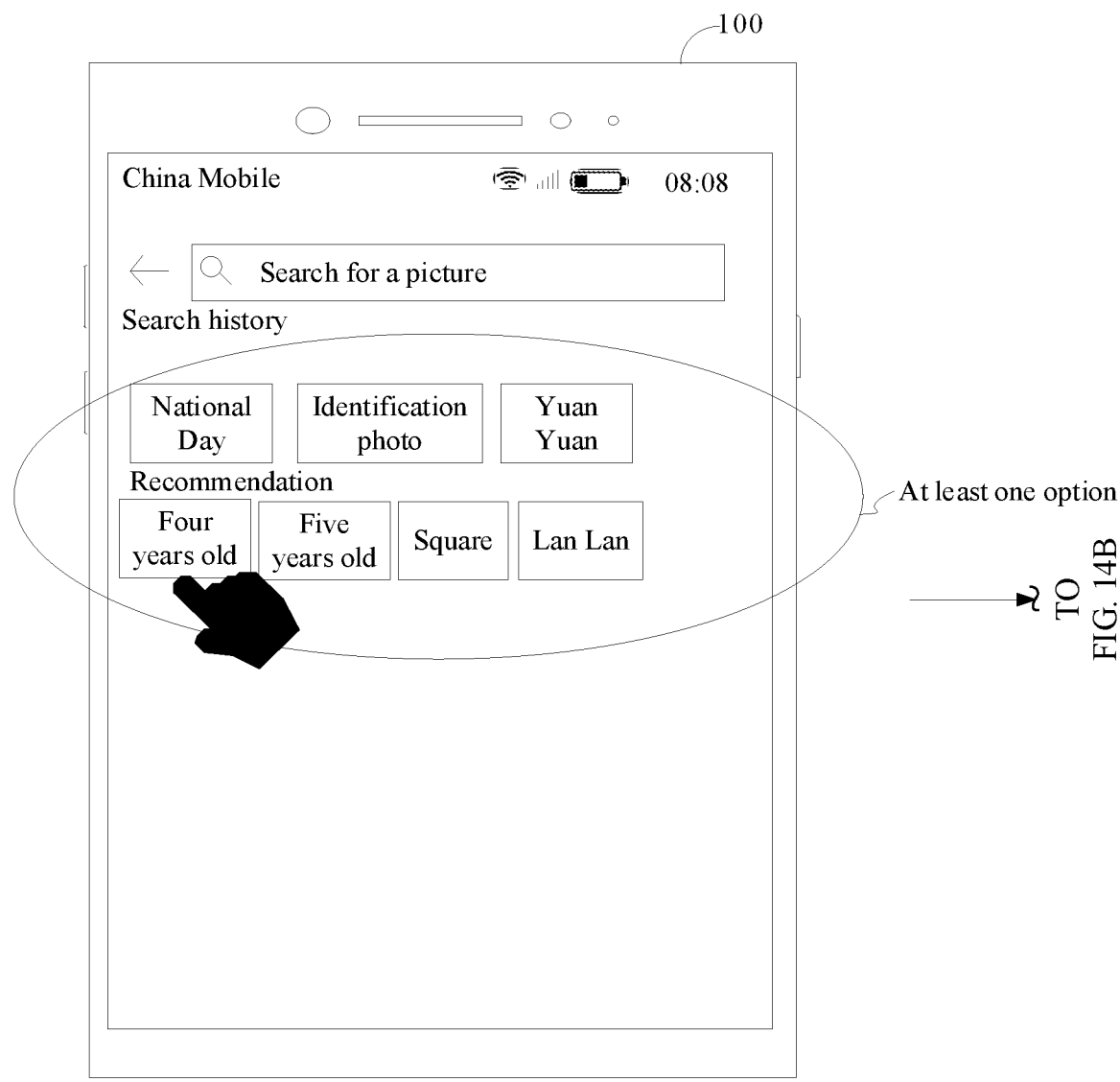
FIG. 14A and FIG. 14B are schematic diagrams of instances of display interfaces according to an embodiment of this application.
Figure 14B:
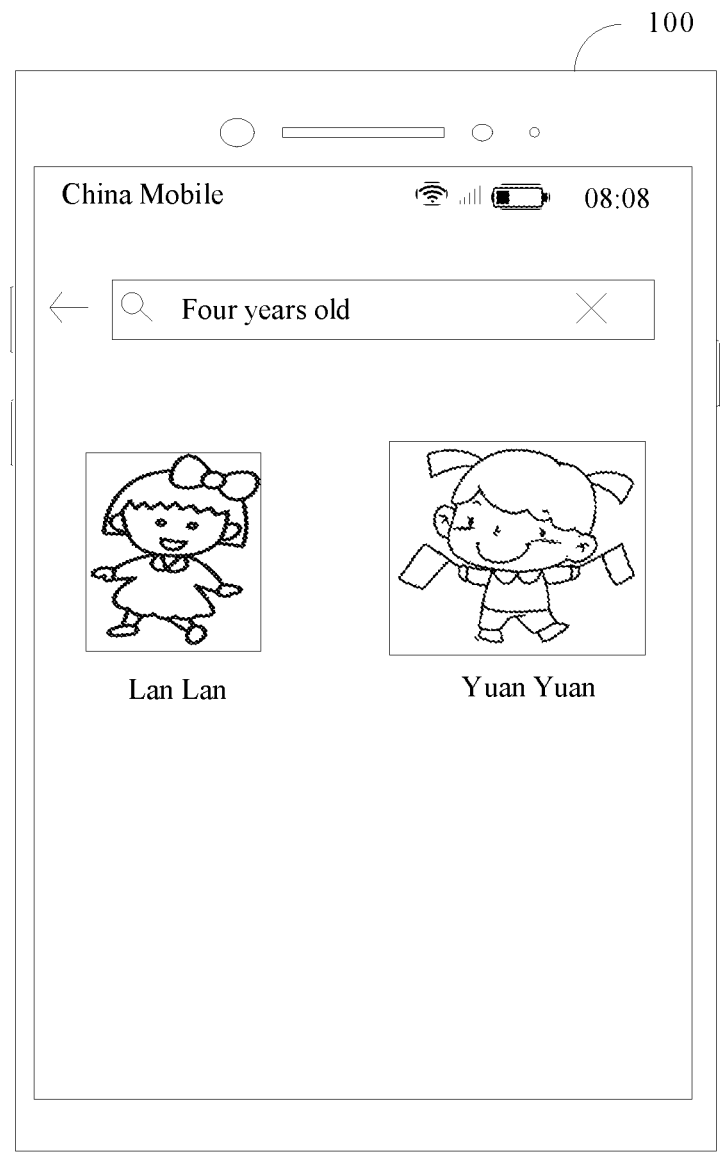

In an example, as shown in FIG. 14A, after the user taps "four years old" (corresponding to the first age in the first search keyword in the embodiments of this application), the mobile phone 100 may display "four years old" in the search input box in response to the tapping operation of the user on "four years old", search for a picture matching "four years old", and display the found picture. If the mobile phone 100 includes a plurality of age albums of four years old, the mobile phone 100 displays each age album of four years old, and further, displays a cover picture of each age album of four years old. As shown in FIG. 14B, the mobile phone 100 displays a cover picture of an age album of "Lan Lan" at four years old and a cover picture of an age album of "Yuan Yuan" at four years old. In the embodiments of this application, each picture shown in FIG. 14B is a picture matching the first search keyword.

Alternatively, if the mobile phone 100 includes one age album of four years old, the mobile phone 100 directly displays all pictures in the age album.

Figure 15A:
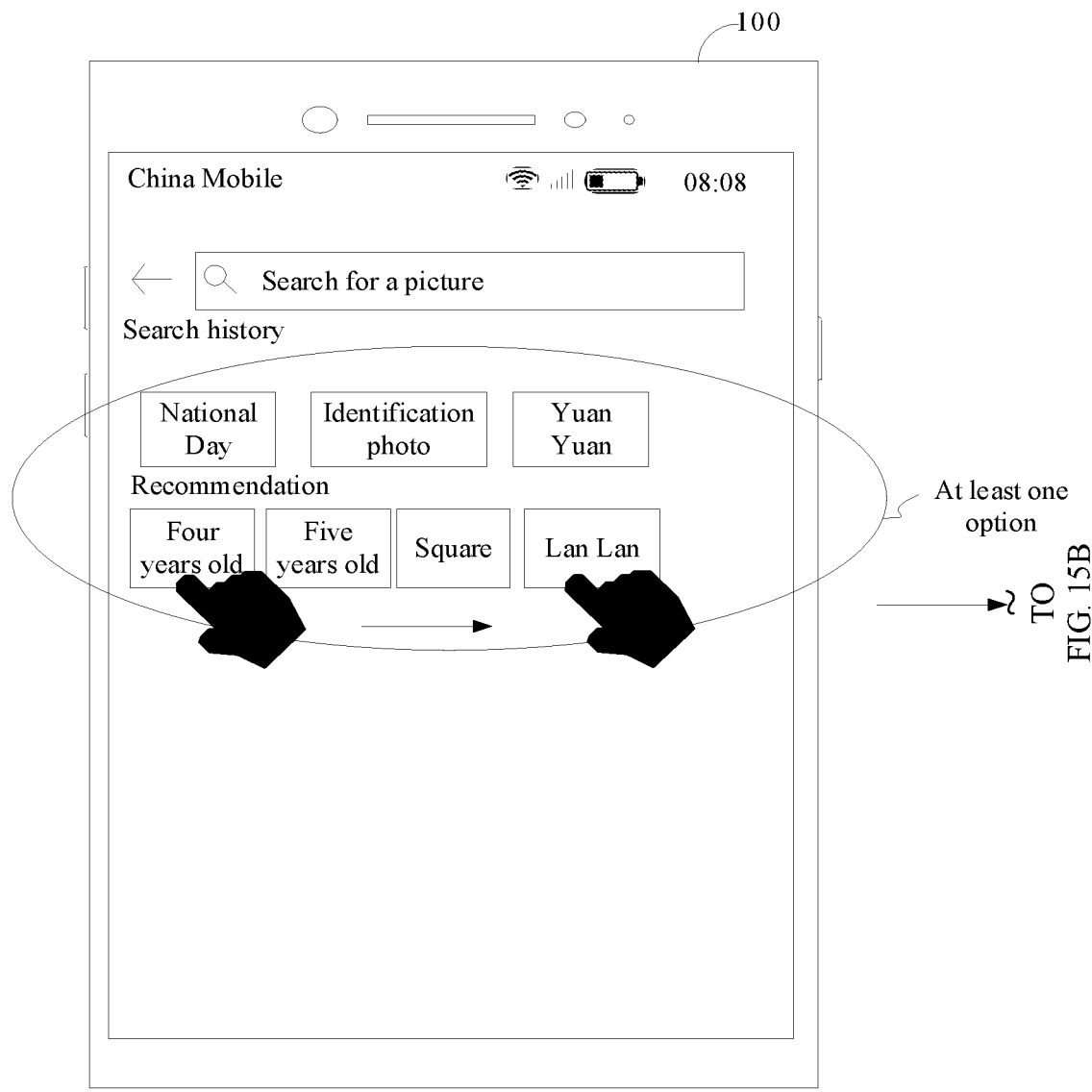
FIG. 15A and FIG. 15B are schematic diagrams of instances of display interfaces according to an embodiment of this application.
Figure 15B:

In another example, as shown in FIG. 15A, after the user taps "four years old" and "Lan Lan" (corresponding to the first age and the first person in the second search keyword in the embodiments of this application), the mobile phone 100 may display "four years old" and "Lan Lan" in the search input box in response to the tapping operation of the user on "four years old" and "Lan Lan", search for a picture matching "four years old" and "Lan Lan", and display the found picture. Optionally, the mobile phone 100 may display a cover picture of an age album of "Lan Lan" at four years old, or may display all pictures of "Lan Lan" at four years old. As shown in FIG. 15B, the mobile phone 100 displays a cover picture of an age album of "Lan Lan" at four years old. In the embodiments of this application, each picture of Lan Lan at four years old shown in FIG. 15B is a picture matching the second search keyword.

Figure 16A:
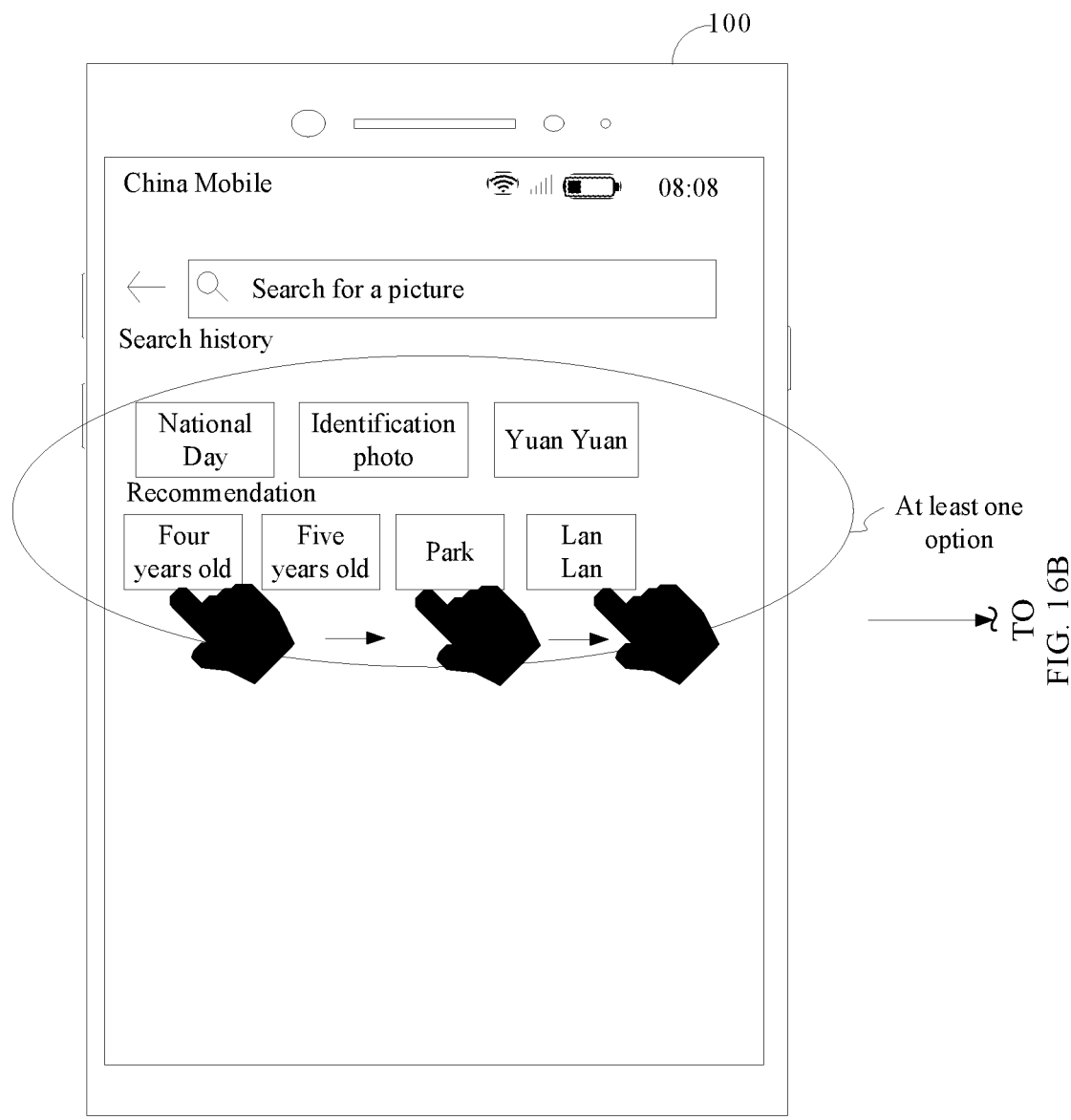
FIG. 16A and FIG. 16B are schematic diagrams of instances of display interfaces according to an embodiment of this application.
Figure 16B:
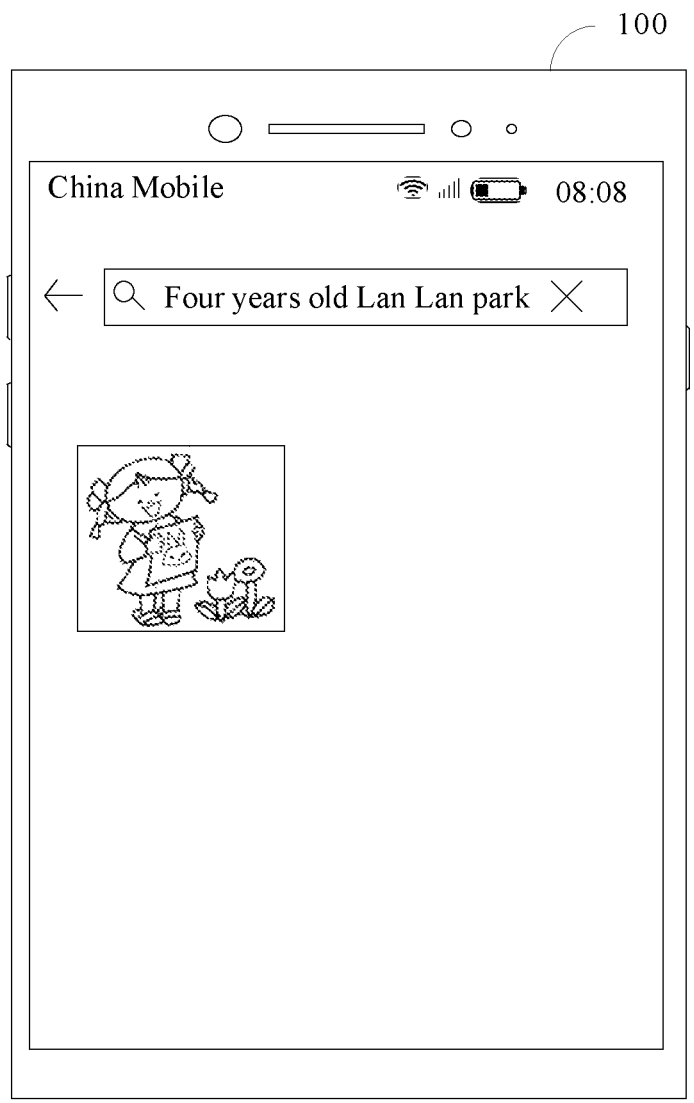

In another example, as shown in FIG. 16A, after the user taps "four years old", "Lan Lan", and "park" (corresponding to the first age, the second person, and the first location in the third search keyword in the embodiments of this application), the mobile phone 100 may display "four years old", "Lan Lan", and "park" in the search input box in response to the tapping operation of the user on "four years old", "Lan Lan", and "park", search for a picture matching "four years old", "Lan Lan", and "park", and display the found picture. Optionally, the mobile phone 100 may display a cover picture of a commemorative album of "Lan Lan" at four years old in the park, or may display all pictures of "Lan Lan" at four years old in the park. As shown in FIG. 16B, the mobile phone 100 displays all pictures of "Lan Lan" at four years old in the park. In the embodiments of this application, each picture of Lan Lan at four years old in the park shown in FIG. 16B is a picture matching the third search keyword.

Optionally, after receiving a tapping operation of the user on an option, the mobile phone 100 may further determine whether a tapping operation of the user on another option is further received within preset duration. If the mobile phone 100 has not received a tapping operation of the user on another option within the preset duration, the mobile phone 100 searches for and displays a picture matching the information about the option tapped by the user.

Certainly, if the mobile phone 100 further divides the pictures in the gallery based on another dimension, a search keyword (a search keyword entered by the user/the information about the option tapped by the user) obtained by the mobile phone 100 may be related information of the other dimension, for example, an age+a photographing location, or an age+a portrait+a holiday, for example, further, four years old park, or four years old Lan Lan children's day. This is not listed herein. If the mobile phone 100 makes pictures classified into one group as a video and an obtained search keyword corresponds to the video, the mobile phone 100 may alternatively directly display the video and/or all pictures in the video.

In the embodiments of this application, if the mobile phone 100 divides the pictures in the gallery based on portraits and ages and generates at least one age album of each portrait, the user may enter the first portrait and the first age, and correspondingly, the mobile phone 100 searches for and displays an age album corresponding to the first portrait and the first age.

In the embodiments of this application, the mobile phone 100 provides a new search dimension, that is, an age, for the user. The user can view a picture of the first age by using a simple operation. In this way, better experience is provided for the user.

Some embodiments of this application provide an electronic device. The electronic device may include a display, a memory, and one or more processors. The display and the memory are coupled to the processor. The memory is configured to store computer program code, where the computer program code includes computer instructions. When the processor executes the computer instructions, the electronic device may perform functions or steps performed by the electronic device in the foregoing method embodiments. For a structure of the electronic device, refer to the structure of the mobile phone 100 shown in FIG. 1.

Figure 17:
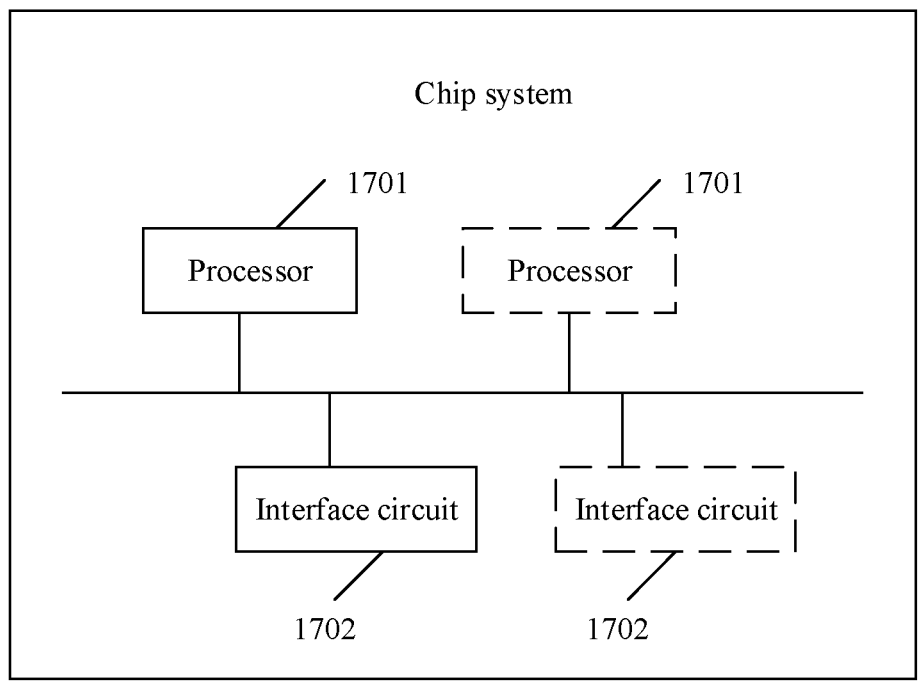
FIG. 17 is a schematic diagram of a structure of a chip system according to an embodiment of this application.

An embodiment of this application further provides a chip system. As shown in FIG. 17, the chip system includes at least one processor 1701 and at least one interface circuit 1702. The processor 1701 and the interface circuit 1702 may be interconnected through a line. For example, the interface circuit 1702 may be configured to receive a signal from another apparatus (for example, a memory of the electronic device). For another example, the interface circuit 1702 may be configured to send a signal to another apparatus (for example, the processor 1701 or the display screen of the electronic device). For example, the interface circuit 1702 may read instructions stored in the memory, and send the instructions to the processor 1701. When the instructions are executed by the processor 1701, the electronic device may be enabled to perform each step in the foregoing embodiments. Certainly, the chip system may further include another discrete component. This is not limited in this embodiment of this application.

An embodiment of this application further provides a computer storage medium. The computer storage medium includes computer instructions, and when the computer instructions are run on the foregoing electronic device, the electronic device is enabled to perform functions or steps performed by the electronic device in the foregoing method embodiments.

An embodiment of this application further provides a computer program product. When the computer program product is run on a computer, the computer is enabled to perform the functions or steps performed by the electronic device in the foregoing method embodiments.

The foregoing descriptions about the implementations allow a person skilled in the art to clearly understand that, for the purpose of convenient and brief description, division into only the foregoing function modules is used as an example for description. In actual application, the foregoing functions can be assigned to different function modules for implementation as required. In other words, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in the embodiments, it should be understood that the disclosed system, apparatus, and method may be implemented in another manner. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. A part or all of the units may be selected based on actual requirements to achieve the objectives of the solutions of the embodiments.

In addition, function units in each of the embodiments may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions in the embodiments essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods in the embodiments. The foregoing storage medium includes any medium that can store program code, such as a flash memory, a removable hard disk, a read-only memory (ROM), a RAM, a magnetic disk, or an optical disc.

The foregoing descriptions are merely specific implementations of the embodiments, but are not intended to limit the protection scope of the embodiments. Any variation or replacement within the technical scope disclosed in the embodiments shall fall within the protection scope of the embodiments. Therefore, the protection scope of the embodiments shall be subject to the protection scope of the claims.

What is claimed is:

1. A picture search method implemented by an electronic device, wherein the picture search method comprises:
    displaying a search interface of an application that manages a gallery of the electronic device, wherein the search interface comprises a search input box, wherein the gallery comprises a first picture and a second picture, wherein the first picture comprises a first image of a first person at a first age when the first picture is captured, and wherein the second picture comprises a second image of a second person at the first age when the second picture is captured;
    receiving, from a user and in the search input box, a first search keyword comprising the first age;
    selecting, from the gallery and based on the first search keyword, the first picture and the second picture;
    displaying the first picture and the second picture;
    receiving, from the user and in the search input box, a third search keyword comprising the first age, a name of the second person, and a first location, wherein a photographing location of the second picture is the first location;
        selecting, from the gallery and based on the third search keyword, and a first mapping relationship, the second picture matching the third search keyword, wherein the
        first mapping relationship comprising a first correspondence between the first age, the name of the second person, the first location, and the second picture; and
    displaying the second picture.

2. The picture search method of claim 1, wherein the search interface further comprises one or more age options, wherein the picture search method further comprises:
    receiving a selection operation of the user on a first age option from the one or more age options, wherein the first age option includes information about the first age; and
    further selecting, from the gallery and based on the selection operation, the first picture and the second picture.

3. The picture search method of claim 1, further comprising:
    receiving, from the user and in the search input box, a second search keyword comprising the first age and a name of the first person; and
    selecting, from the gallery and based on the second search keyword, the first picture matching the second search keyword.

4. The picture search method of claim 3, further comprising:
    storing a second mapping relationship comprising a second correspondence between the first age, the name of the first person, and the first picture; and
    further selecting, from the gallery and based on the second mapping relationship, the first picture matching the first age and the name of the first person.

5. The picture search method of claim 1, wherein the mapping relationship comprises a second correspondence between the name of the first person and a photographing time or a picture source of the first picture.

6. An electronic device comprising:
    a display screen; and
    a processor coupled to the display screen and configured to:
        control the display screen to display a search interface of an application that manages a gallery of the electronic device, wherein the search interface comprises a search input box, wherein the gallery comprises a first picture and a second picture, wherein the first picture comprises a first image of a first person at a first age when the first picture is captured, and wherein the second picture comprises a second image of a second person at the first age when the second picture is captured;
        receive, from a user and in the search input box, a first search keyword comprising the first age;
        select, from the gallery and based on the first search keyword, the first picture and the second picture that match the first search keyword;
        receive, from the user and in the search input box, a third search keyword comprising the first age, a name of the second person, and a first location, wherein a photographing location of the second picture is the first location;
        select, from the gallery and based on the third search keyword, and a first mapping relationship, the second picture matching the third search keyword, wherein the; and first mapping relationship comprising a first correspondence between the first age, the name of the second person, the first location, and the second picture; and
        control the display screen to display the first picture and the second picture.

7. The electronic device of claim 6, wherein the search interface further comprises one or more age options, and the processor is further configured to:
    receive a selection operation of the user on a first age option from the one or more age options, wherein the first age option includes information about the first age; and further select, from the gallery and based on the selection operation, the first picture and the second picture that match the first age.

8. The electronic device of claim 6, wherein the processor is further configured to:
receive, from the user and in the search input box, a second search keyword comprising the first age and a name of the first person; and
select, from the gallery and based on the second search keyword, the first picture matching the second search keyword.

9. The electronic device of claim 8, wherein the processor is further configured to:
store a second mapping relationship comprising a second correspondence between the first age, the name of the first person, and the first picture; and
further select, from the gallery and based on the second mapping relationship, the first picture matching the first age and the name of the first person.

10. The electronic device of claim 6, wherein the mapping relationship comprises a second correspondence between the name of the first person and a photographing time or a picture source of the first picture.

11. A picture search method implemented by an electronic device, wherein the picture search method comprises:
storing a mapping relationship comprising a first correspondence between a first age and a first picture and a second correspondence between the first age and a second picture;
displaying a search interface of an application that manages a gallery of the electronic device, wherein the search interface comprises a search input box, wherein the gallery comprises a first picture and a second picture, wherein the first picture comprises a first image of a first person at a first age when the first picture is captured, and wherein the second picture comprises a second image of a second person at the first age when the second picture is captured;
receiving, from a user and in the search input box, a first search keyword comprising the first age;
selecting, from the gallery and based on the mapping relationship, the first picture and the second picture;
storing a first mapping relationship comprising a first correspondence between the first age, a name of the second person, a first location, and the second picture;
further selecting, from the gallery and based on the first mapping relationship, the second picture matching the first age, the name of the second person, and the first location; and
displaying the first picture and the second picture.

12. The picture search method of claim 11, wherein the search interface further comprises one or more age options, wherein the picture search method further comprises:
receiving a selection operation of the user on a first age option from the one or more age options, wherein the first age option includes information about the first age; and
further selecting, from the gallery and based on the selection operation, the first picture and the second picture.

13. The picture search method of claim 11, further comprising:
receiving, from the user and in the search input box, a second search keyword comprising the first age and a name of the first person; and
selecting, from the gallery and based on the second search keyword, the first picture matching the second search keyword.

14. The picture search method of claim 13, further comprising:
storing a second mapping relationship comprising a second correspondence between the first age, the name of the first person, and the first picture; and
further selecting, from the gallery and based on the second mapping relationship, the first picture matching the first age and the name of the first person.

15. The picture search method of claim 11, wherein the mapping relationship comprises a second correspondence between the name of the first person and a photographing time or a picture source of the first picture.

16. An electronic device comprising:
a display screen; and
a processor coupled to the display screen and configured to:
control the display screen to display a search interface of an application that manages a gallery of the electronic device, wherein the search interface comprises a search input box, wherein the gallery comprises a first picture and a second picture, wherein the first picture comprises a first image of a first person at a first age when the first picture is captured, and wherein the second picture comprises a second image of a second person at the first age when the second picture is captured;
receive, from a user and in the search input box, a first search keyword comprising the first age;
select, from the gallery and based on the first search keyword, the first picture and the second picture that match the first search keyword;
store a first mapping relationship comprising a first correspondence between the first age and the first picture and a second correspondence between the first age and the second picture;
further select, from the gallery and based on the first mapping relationship, the first picture and the second picture;
store a second mapping relationship comprising a correspondence between the first age, a name of the second person, a first location, and the second picture;
further select, from the gallery and based on the second mapping relationship, the second picture matching the first age, the name of the second person, and the first location; and
control the display screen to display the first picture and the second picture.

17. The electronic device of claim 16, wherein the search interface further comprises one or more age options, wherein the processor is further configured to:
receive a selection operation of the user on a first age option from the one or more age options, wherein the first age option includes information about the first age; and
further select, from the gallery and based on the selection operation, the first picture and the second picture.

18. The electronic device of claim 16, wherein the processor is further configured to:
receive, from the user and in the search input box, a second search keyword comprising the first age and a name of the first person; and
select, from the gallery and based on the second search keyword, the first picture matching the second search keyword.

19. The electronic device of claim 18, wherein the processor is further configured to:
- store a mapping relationship comprising a correspondence between the first age, the name of the first person, and the first picture; and
- further select, from the gallery and based on the mapping relationship, the first picture matching the first age and the name of the first person.

20. The electronic device of claim 16, wherein the mapping relationship comprises a second correspondence between the name of the first person and a photographing time or a picture source of the first picture.

* * * * *

UNITED STATES PATENT AND TRADEMARK OFFICE
CERTIFICATE OF CORRECTION

| | | |
|---|---|---|
| PATENT NO. | : 12,361,055 B2 | Page 1 of 1 |
| APPLICATION NO. | : 17/704853 | |
| DATED | : July 15, 2025 | |
| INVENTOR(S) | : Xin Zhang | |

It is certified that error appears in the above-identified patent and that said Letters Patent is hereby corrected as shown below:

In the Claims

Claim 6, Column 24, Line 55: "wherein the; and first" should read "wherein the first"

Signed and Sealed this
Nineteenth Day of August, 2025

Coke Morgan Stewart
*Acting Director of the United States Patent and Trademark Office*